US012641578B2

(12) United States Patent
Chen et al.

(10) Patent No.: US 12,641,578 B2
(45) Date of Patent: May 26, 2026

(54) METHOD AND DEVICE FOR MULTIPLE NETWORK CONNECTIONS IN WIRELESS COMMUNICATIONS

(71) Applicant: Apogee 5G Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 434 days.

(21) Appl. No.: 17/973,472

(22) Filed: Oct. 25, 2022

(65) Prior Publication Data

US 2023/0038022 A1 Feb. 9, 2023

Related U.S. Application Data

(63) Continuation of application No. PCT/CN2021/139148, filed on Dec. 17, 2021.

(30) Foreign Application Priority Data

Dec. 21, 2020 (CN) .......................... 202011518615.5

(51) Int. Cl.
*H04W 4/00* (2018.01)
*H04W 72/0446* (2023.01)
(Continued)

(52) U.S. Cl.
CPC ........ *H04W 72/0446* (2013.01); *H04W 24/10* (2013.01); *H04W 76/16* (2018.02)

(58) Field of Classification Search
CPC ......... H04W 72/0446; H04W 72/1263; H04W 72/20
See application file for complete search history.

(56) References Cited

U.S. PATENT DOCUMENTS

2009/0163145 A1 6/2009 Xhafa
2020/0127788 A1 4/2020 Wu et al.
(Continued)

FOREIGN PATENT DOCUMENTS

CN 1671231 A 9/2005
CN 105306681 A 2/2016
(Continued)

OTHER PUBLICATIONS

First Office Action of Chinese patent application No. CN202011518615.5 dated Jan. 1, 2024.
(Continued)

*Primary Examiner* — Abdelnabi O Musa
(74) *Attorney, Agent, or Firm* — Volpe Koenig

(57) ABSTRACT

The present disclosure provides a method and a device for wireless communications, including transmitting a first message; the first message being used to indicate K1 time windows; and receiving a first signaling; herein, K1 is a positive integer greater than 1; any two of the K1 time windows are orthogonal, the K1 time windows are chronologically arranged, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows. The present disclosure is useful in decreasing conflicts.

20 Claims, 6 Drawing Sheets

(51) Int. Cl.
    *H04W 24/10*      (2009.01)
    *H04W 76/16*      (2018.01)

(56)           References Cited

U.S. PATENT DOCUMENTS

| | | | |
|---|---|---|---|
| 2020/0245174 A1* | 7/2020 | Lu | H04B 7/18506 |
| 2020/0313804 A1* | 10/2020 | Ryu | H04W 72/20 |
| 2021/0345410 A1* | 11/2021 | Zhou | H04W 74/0833 |
| 2022/0210869 A1* | 6/2022 | Zhang | H04L 1/1628 |
| 2022/0353825 A1* | 11/2022 | Ryu | H04W 52/383 |
| 2023/0055487 A1* | 2/2023 | Jin | H04W 76/16 |
| 2023/0144243 A1* | 5/2023 | Jin | H04W 4/40 |
| | | | 370/329 |
| 2023/0413365 A1* | 12/2023 | Chen | H04W 8/20 |
| 2024/0022278 A1* | 1/2024 | Zhou | H04W 52/365 |
| 2024/0114474 A1* | 4/2024 | Rune | H04W 24/10 |
| 2024/0147493 A1* | 5/2024 | Yu | H04L 5/0051 |
| 2024/0243872 A1* | 7/2024 | Yu | H04W 76/19 |

FOREIGN PATENT DOCUMENTS

| | | |
|---|---|---|
| CN | 111294986 A | 6/2020 |
| CN | 113597014 A | 11/2021 |
| CN | 114245475 A | 3/2022 |
| WO | 2019024093 A1 | 2/2019 |
| WO | 2019119411 A1 | 6/2019 |
| WO | 2024037475 A1 | 2/2024 |

OTHER PUBLICATIONS

First Search Report of Chinese patent application No. CN202011518615.5 dated Dec. 29, 2023.

ISR received in application No. PCT/CN2021/139148 dated Feb. 2022.

Third Generation Partnership Project, "Technical Specification Group Services and System Aspects; Service aspects; Service principles (Release 15)," 3GPP TS 22.101 V15.7.0 (Jun. 2019).

Third Generation Partnership Project, "Technical Specification Group Services and System Aspects; Service aspects; Service principles (Release 18)," 3GPP TS 22.101 V18.0.0 (Dec. 2020).

Third Generation Partnership Project, "Technical Specification Group Radio Access Network; NR; Physical channels and modulation (Release 16)," 3GPP TS 38.211 V16.3.0 (Sep. 2020).

Third Generation Partnership Project, "Technical Specification Group Radio Access Network; NR; Multiplexing and channel coding (Release 16)," 3GPP TS 38.212 V16.3.0 (Sep. 2020).

Third Generation Partnership Project, "Technical Specification Group Radio Access Network; NR; Physical layer procedures for control (Release 16)," 3GPP TS 38.213 V16.3.0 (Sep. 2020).

Third Generation Partnership Project, "Technical Specification Group Radio Access Network; NR; Physical layer procedures for data (Release 16)," 3GPP TS 38.214 V16.3.0 (Sep. 2020).

Third Generation Partnership Project, "Technical Specification Group Radio Access Network; NR; Medium Access Control (MAC) protocol specification (Release 16)," 3GPP TS 38.321 V16.2.1 (Sep. 2020).

Third Generation Partnership Project, "Technical Specification Group Radio Access Network; NR; Radio Resource Control (RRC) protocol specification (Release 16)," 3GPP TS 38.331 V16.2.0 (Sep. 2020).

* cited by examiner

| Second node N12 | First node U11 | Third node N13 |
|---|---|---|

F61.optional

S6301.transmitting second signaling

←second signaling—

S6101.receiving second signaling

S6102.transmitting second message

←second message—

S6201.receiving second message

S6103.transmitting first message

←first message—

S6202.receiving first message

S6203.transmitting first signaling

—first signaling→

S6104.receiving first signaling

F62.optional

S6105.transmitting third signal

—third signal→

S6302.receiving third signal

S6106.transmitting first signal

←first signal—

S6204.receiving first signal ( End )        ( End )        ( End )

FIG. 6

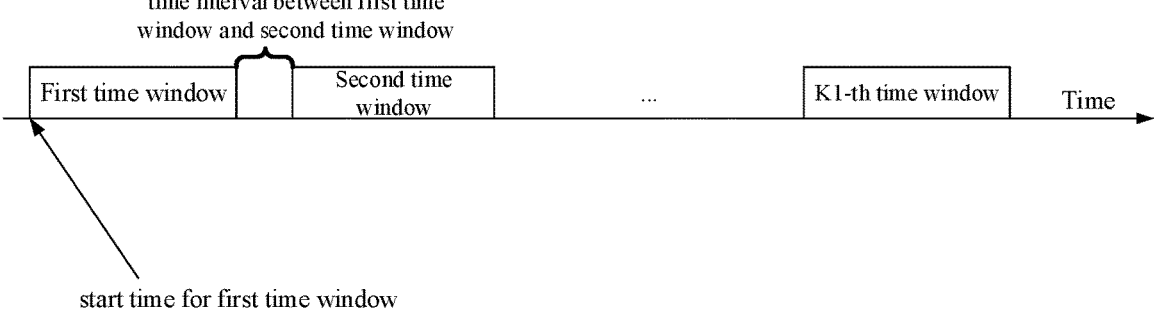

time interval between first time
window and second time window

| First time window | | Second time window | ... | K1-th time window | Time | start time for first time window

FIG. 7

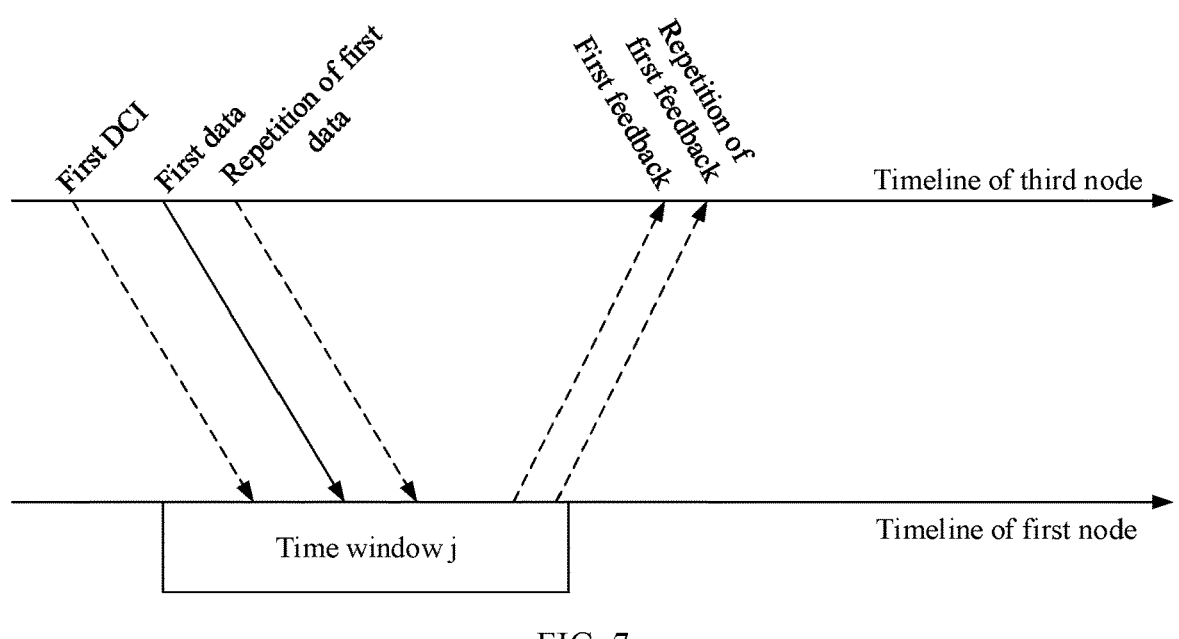
FIG. 7a
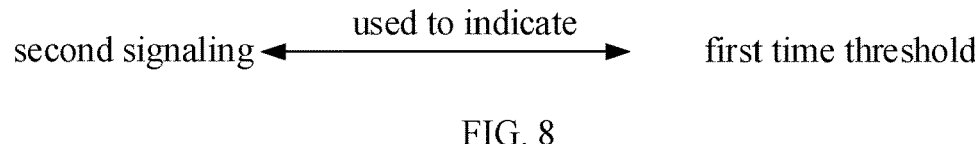
FIG. 8
first transmitter ⟷ suspending in K1 time windows ⟷ first timer
FIG. 9
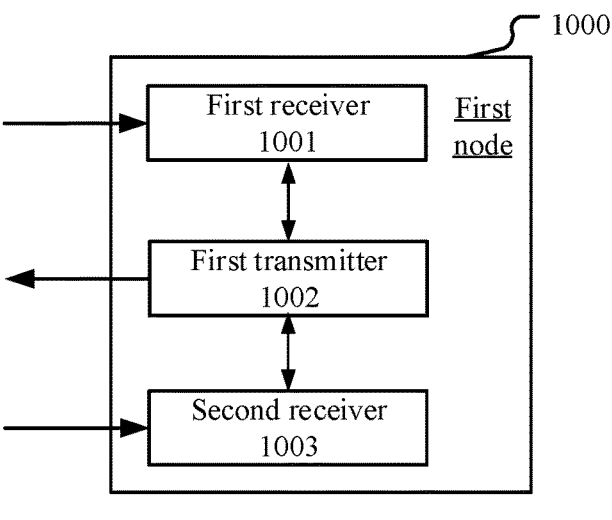
FIG. 10

1

METHOD AND DEVICE FOR MULTIPLE NETWORK CONNECTIONS IN WIRELESS COMMUNICATIONS

CROSS REFERENCE TO RELATED APPLICATIONS

This application is the continuation of the International patent application No. PCT/CN2021/139148, filed on Dec. 17, 2021, which claims the priority benefit of Chinese Patent Application No. 202011518615.5, filed on Dec. 21, 2020, the full disclosure of which is incorporated herein by reference.

BACKGROUND

Technical Field

The present disclosure relates to transmission methods and devices in wireless communication systems, and in particular to a method of improving efficiency and reducing breakoff involving multiple network communications in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In communications, both Long Term Evolution (LTE) and 5G NR involves correct reception of reliable information, optimized energy efficiency ratio (EER), determination of information validity, flexible resource allocation, elastic system structure, effective information processing on non-access stratum, and lower traffic interruption and call drop rate, higher security and privacy and support to lower consumption, which play an important role in the normal communication between a base station and a User Equipment (UE), rational scheduling of resources, and also in the balance of system payload, thus laying a solid foundation for increasing throughput, meeting a variety of traffic needs in communications, enhancing the spectrum utilization and improving service quality. Therefore, LTE and 5G are indispensable no matter in enhanced Mobile BroadBand (eMBB), Ultra Reliable Low Latency Communication (URLLC) or enhanced Machine Type Communication (eMTC). And a wide range of requests can be found in terms of Industrial Internet of Things (IIoT), Vehicular to X (V2X), Proximity Services (ProSe) and Device to Device (D2D), Unlicensed Spectrum communications, and monitoring on UE communication quality, network plan optimization, Non Terrestrial Network (NTN) and Terrestrial Network (TN), Dual connectivity system, sidelink-adopted system, or combined, radio resource management and multi-antenna codebook selection, as well as signaling design, neighbor management, traffic management and beamforming. Information is generally transmitted by broadcast and unicast, and both ways are beneficial to fulfilling the above requests and make up an integral part of the 5G system. Information can also be forwarded through relaying to expand the network coverage and improve the system reliability. With the advancement of the capacities of the communication terminal, the terminal can be equipped with one or more Subscriber Identity Module (SIM) cards. When multiple SIM cards are used and connected to multiple networks, how to coordinate between different networks becomes a key issue for the receiver module of the terminal.

As the number and complexity of system scenarios increases, more and more requirements have been made on reducing interruption rate and latency, strengthening reliability and system stability, increasing the traffic flexibility and power conservation, and in the meantime the compatibility between different versions of systems shall be taken into account for system designing.

SUMMARY

When a User Equipment (UE), for instance a terminal or a cellphone, is required to be in communications with multiple networks, particularly when using multiple corresponding SIM cards, it will involve the coordination between different networks. When a UE's own hardcore is inadequate to perform communications with two networks synchronously and independently, in a parallel manner and free of impact from each other, if coordination can be done with the aid of networks or spontaneously initiated by the UE, mutual influences by these two networks can be effectively prevented, for instance, when the UE needs to communicate with another network, it will be affected by the current network indicating its data transmission or reception. Some UEs may have two receivers and only one transmitter, which means that these UEs may conditionally be able to receive signals from two networks simultaneously but can only transmit for just one network; certainly, there are also some UEs which can only receive signals from one network at the same time; whatever, for many UEs, it is impossible to transmit signals to two networks simultaneously. Since two or more SIM cards in a UE may come from different operators, the coordination between networks are very limited, so the UE can hardly depend on inter-network coordination, moreover, for the sake of privacy protection, transferring user information between networks shall be forbidden. When a UE leaves a network temporarily for another network to receive or transmit, for instance, to update a serving cell in another network, its influence on the current network is acceptable; but if a UE leaves for a long time, it may cause a great impact on the current network, for instance, a long-term occupancy of some resources will affect the measurements, mobility and synchronization, and the complexity incurred on the networks protocols must not be ignored; in this case, the network will potentially release the UE connection, which will result in traffic interruption, and a delay will be brought in a reconnection, thus, a UE capable of receiving from two networks simultaneously will be unable to listen on signals issued under the current network. Therefore, the short-term departure seems to be only applicable to some simple tasks, which means there are some limitations on performing these tasks. Though unable to apply to all tasks, it can be used to address most cases. Even if under such circumstance, things will get tricky, for example, when another network is an NTN or the like, having a large transmission delay up to hundreds of milliseconds or even one or two seconds, a UE is required to have interactions with the network for many times to finish a task; for a TN, a simpler task containing several interactions can be completed within dozens of milliseconds, but it will require dozens of seconds or longer for the NTN to do so.

As described above, if the current network only allows the UE to leave for a very short period of time, it will lead to a result that when another network is an NTN, no task can be accomplished within the period and there will be no way to coordinate in between, thus making it hard to avoid conflicts between the two networks. By designating a new multi-time-window mechanism, the present disclosure can solve the above problem.

To address the above problem, the present disclosure provides a solution.

It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict. It should be noted that the present disclosure also applies to scenarios where, for instance, Unmanned Aerial Vehicle (UAV) or vehicle-mounted networks, or where larger time delay is required for transmission, or services are sensitive to time delay, to achieve similar technical effects. Additionally, the adoption of a unified solution for various scenarios, including but not limited to NTN and TN scenarios, contributes to the reduction of hardcore complexity and costs.

The present disclosure provides a method in a first node for wireless communications, comprising:

transmitting a first message; the first message being used to indicate K1 time windows; and receiving a first signaling; and herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

In one embodiment, the problem to be solved in the present disclosure comprises: when a UE is unable to transmit certain radio signals simultaneously for two networks, it needs to ask the current network for an access to a second network; when there is a relatively large transmission delay in the UE-second network communication, for example, if the second network is an NTN, or if the second network is a TN but the current network is transmitting some low-delay services, such as URLLC traffics, a request for a long-time departure is unacceptable to the current network, thus leading to conflicts between two network communications, which may cause unexpected delays or drops. The present disclosure addresses the above issues by specially designing K1 time windows and a corresponding method and operations.

In one embodiment, an advantage of the above method comprises: avoiding conflicts between two networks as well as potential drops and extra time delay.

Specifically, according to one aspect of the present disclosure, receiving a second signaling, the second signaling being used to indicate the first time threshold.

Specifically, according to one aspect of the present disclosure, the first message indicates a start of a first time window among the K1 time windows.

Specifically, according to one aspect of the present disclosure, transmitting a first signal, the first signal being used to request for performing the wireless transmission for the transmitter for the first signaling in a target time-domain resource;

herein, the target time-domain resource belongs to the K1 time windows.

Specifically, according to one aspect of the present disclosure, transmitting a third signal to a third node within the K1 time windows, the third node and the transmitter for the first signaling belonging to different PLMNs.

Specifically, according to one aspect of the present disclosure, transmitting a second message; the second message is used to indicate that the first node can receive signals transmitted by the transmitter for the first signaling within the K1 time windows; a transmission time for the second message is a period of time other than the K1 time windows.

Specifically, according to one aspect of the present disclosure, suspending a first timer within the K1 time windows, the first timer being configured by the transmitter for the first signaling.

Specifically, according to one aspect of the present disclosure, the first node is a UE.

Specifically, according to one aspect of the present disclosure, the first node is a terminal of Internet of Things (IoT).

Specifically, according to one aspect of the present disclosure, the first node is a relay.

Specifically, according to one aspect of the present disclosure, the first node is a vehicle-mounted terminal.

Specifically, according to one aspect of the present disclosure, the first node is an aircraft.

The present disclosure provides a method in a second node for wireless communications, comprising:

receiving a first message; the first message being used to indicate K1 time windows; and transmitting a first signaling; and herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for the second node in the K1 time windows; the first signaling is used for indicating acceptance of the request of the first message; a transmission time for the first message is a period of time other than the K1 time windows; a transmitter for the first message maintains an RRC connection with the second node within the K1 time windows, the first time threshold is of a length no shorter than a slot.

Specifically, according to one aspect of the present disclosure, a transmitter for the first message receives a second signaling, the second signaling being used to indicate the first time threshold.

Specifically, according to one aspect of the present disclosure, the first message indicates a start of a first time window among the K1 time windows.

Specifically, according to one aspect of the present disclosure, receiving a first signal, the first signal being used to request for performing the wireless transmission for the second node in a target time-domain resource;

herein, the target time-domain resource belongs to the K1 time windows.

Specifically, according to one aspect of the present disclosure, the transmitter for the first message transmits a third signal to a third node within the K1 time windows, the third node and the second node belonging to different PLMNs.

Specifically, according to one aspect of the present disclosure, receiving a second message; the second message is used to indicate that the transmitter for the first message can receive signals transmitted by the second node within the K1 time windows; a transmission time for the second message is a period of time other than the K1 time windows.

Specifically, according to one aspect of the present disclosure, the transmitter for the first message suspends a first timer within the K1 time windows, the first timer being configured by the second node.

Specifically, according to one aspect of the present disclosure, the second node is a UE.

Specifically, according to one aspect of the present disclosure, the second node is a terminal of Internet of Things (IoT).

Specifically, according to one aspect of the present disclosure, the second node is a satellite.

Specifically, according to one aspect of the present disclosure, the second node is a relay.

Specifically, according to one aspect of the present disclosure, the second node is a vehicle-mounted terminal.

Specifically, according to one aspect of the present disclosure, the second node is an aircraft.

Specifically, according to one aspect of the present disclosure, the second node is a base station.

Specifically, according to one aspect of the present disclosure, the second node is a cell or cell group.

Specifically, according to one aspect of the present disclosure, the second node is a gateway.

Specifically, according to one aspect of the present disclosure, the second node is an access point.

The present disclosure provides a first node for wireless communications, comprising:

a first transmitter, transmitting a first message; the first message being used to indicate K1 time windows; and a first receiver, receiving a first signaling; and herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

The present disclosure provides a second node for wireless communications, comprising:

a third receiver, receiving a first message; the first message being used to indicate K1 time windows; and a third transmitter, transmitting a first signaling;

herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for the second node in the K1 time windows; the first signaling is used for indicating acceptance of the request of the first message; a transmission time for the first message is a period of time other than the K1 time windows; a transmitter for the first message maintains an RRC connection with the second node within the K1 time windows, the first time threshold is of a length no shorter than a slot.

In one embodiment, compared with the prior art, the present disclosure is advantageous in the following aspects:

Firstly, for a network with a longer transmission delay, the present method can also support coordination between two networks, thus avoiding the issue of conflict possibly caused by one UE's camping or communications with two networks. In the present disclosure, for a network having a larger air-interface transmission delay and a smaller processing delay, a UE, for instance targeting a specific task, which requests for departure for discrete periods of time, and the entire length of departure time is a sum of time lengths of K1 windows, equivalent to a network with a delay that is not too large, thus reducing the impact of departure on a first network transmission and/or reception.

Then, when a UE request to leave or switch to a second network, its departure time takes into account the transmission properties of the second network. Since the satellite in NTN, particularly a low-orbit one is traveling in a fast speed, the time for distance between the satellite and the UE varies with it, and a time interval of time windows requested by the UE can match with the satellite and the UE's mobility, the interval of time windows can be unevenly distributed, and be associated with the satellite mobility. An advantage of the method is to achieve the minimum interruption caused by departure and perfectly suit the demands of communications of the second network.

Further, when communicating with the second network, the UE can tell the second network information of time windows having been applied, which is beneficial for the second node to allocate and schedule time-frequency resources, set priorities and optimize the communication procedure, thus ensuring that the UE-second network communication is completed in a short period.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of signaling transmission according to one embodiment of the present disclosure.

FIG. 7 illustrates a schematic diagram of K1 time windows according to one embodiment of the present disclosure.

FIG. 7a illustrates a schematic diagram of transmitting and receiving within a time window j according to one embodiment of the present disclosure.

FIG. 8 illustrates a schematic diagram of a second signaling used to indicate a first time threshold according to one embodiment of the present disclosure.

FIG. 9 illustrates a schematic diagram of a first transmitter suspending a first timer within K1 time windows according to one embodiment of the present disclosure.

FIG. 10 illustrates a structure block diagram of a processing device in a first node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
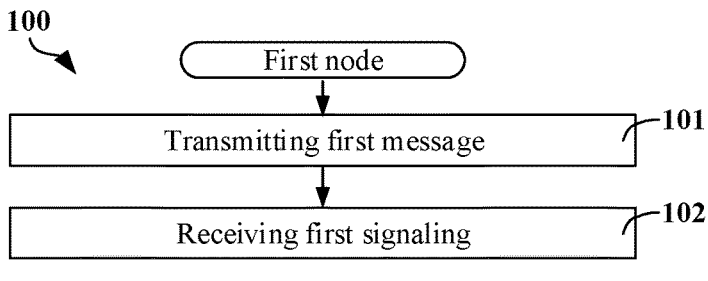
FIG. 1 illustrates a flowchart of transmitting a first message and receiving a first signaling according to one embodiment of the present disclosure.

Embodiment 1 illustrates a flowchart of transmitting a first message and receiving a first signaling according to one embodiment of the present disclosure, as shown in FIG. 1. In FIG. 1, each step represents a step, it should be particularly noted that the sequence order of each box herein does not imply a chronological order of steps marked respectively by these boxes.

In Embodiment 1, the first node in the present disclosure transmits a first message in step 101; and receives a first signaling in step 102;

herein, the first message is used for indicating K1 time windows, where K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

In one embodiment, the first node is a UE.

In one embodiment, a transmitter for the first signaling is a serving cell for the first node.

In one embodiment, a transmitter for the first signaling is a PCell for the first node.

In one embodiment, a transmitter for the first signaling is a SpCell for the first node.

In one embodiment, a transmitter for the first signaling is a SCell for the first node.

In one embodiment, a transmitter for the first signaling is an MCG for the first node.

In one embodiment, a transmitter for the first signaling is an SCG for the first node.

In one embodiment, a transmitter for the first signaling is a cell on which the first node is camped.

In one embodiment, a transmitter for the first signaling is a network to which the first node is connected.

In one embodiment, the first node has two SIM cards, one is for the transmitter for the first signaling; and the other is for a network other than the transmitter for the first signaling.

In one embodiment, the SIM card comprises a Universal Subscriber Identity Module (USIM) card.

In one embodiment, the SIM card comprises an eSIM card.

In one embodiment, the SIM card comprises a Universal Integrated Circuit Card (UICC).

In one embodiment, the SIM card includes different sizes.

In one embodiment, the SIM card is for at least one of {LTE network, NR network, 3G network, 4G network, 5G network, 6G network, TN network, NTN network, URLLC network, IoT network, vehicle-mounted network, Industrial IoT, broadcast network, unicast network, 3GPP network, non-3GPP network}.

In one embodiment, the first node has a transmitter and a receiver.

In one embodiment, the first node has a transmitter and two receivers.

In one embodiment, there is an RRC connection between the first node and the transmitter for the first signaling.

In one embodiment, the first node is in an RRC connected state relative to the transmitter for the first signaling.

In one embodiment, the first node is in an RRC connected state relative to a network other than the transmitter for the first signaling.

In one embodiment, the first node is in an RRC idle state relative to a network other than the transmitter for the first signaling.

In one embodiment, the first node is in an RRC inactive state relative to a network other than the transmitter for the first signaling.

In one embodiment, the phrase that the first node maintains an RRC connection with the transmitter for the first signaling within the K1 time windows comprises the following meaning: before the K1 time windows an RRC link between the first node and the transmitter for the first signaling is in a connected state, and/or within the K1 time windows an RRC link between the first node and the transmitter for the first signaling is in a connected state.

In one embodiment, an RRC link between the first node and the transmitter for the first signaling is in a connected state before a start of the K1 time windows.

In one embodiment, an RRC link between the first node and the transmitter for the first signaling is in a connected state within the K1 time windows.

In one embodiment, an RRC link between the first node and the transmitter for the first signaling is in a connected state before the K1 time windows start; an RRC link between the first node and the transmitter for the first signaling is in a connected state within the K1 time windows.

In one embodiment, an RRC link between the first node and the transmitter for the first signaling is in a connected state at an end of a last time window of the K1 time windows.

In one embodiment, an RRC link between the first node and the transmitter for the first signaling is in a connected state during a period of time from a start of a first time window to an end of a last time window of the K1 time windows.

In one embodiment, the first node does not offer to enter any state other than the RRC connected state within the K1 time windows.

In one embodiment, the first node enters an RRC idle state within time intervals of the K1 time windows.

In one embodiment, the first node enters an RRC idle state as indicated or automatically within time intervals of the K1 time windows.

In one embodiment, the transmitter for the first signaling does not indicate that the first node enters a state other than the RRC connected state within the K1 time windows.

In one embodiment, a transmitter for the first signaling does not release an RRC connection of the first node.

In one embodiment, states other than the RRC connected state include an RRC idle state and an RRC inactive state.

In one embodiment, the first message is transmitted via a Uu interface.

In one embodiment, the first message comprises an RRC message.

In one embodiment, the first message comprises a Uplink Control Information (UCI) message.

In one embodiment, a physical channel occupied by the first message comprises a Physical Uplink Shared Channel (PUSCH).

In one embodiment, a logical channel occupied by the first message comprises a Dedicated Control CHannel (DCCH).

In one embodiment, the first message is transmitted using an SRB1 or an SRB3.

In one embodiment, the first message comprises at least partial fields in UEAssistanceInformation.

In one embodiment, the first message comprises a UELeavingRequest.

In one embodiment, the first message comprises a UESwitchingRequest.

In one embodiment, the first message comprises a UEShortLeavingRequest.

In one embodiment, the first message comprises a UEAvailablilityIndication.

In one embodiment, the first message comprises a UEInavailablilityIndication.

In one embodiment, the first message comprises a RRCReconfigurationSidelink.

In one embodiment, the first message comprises a MCGFailureInformation.

In one embodiment, the first message comprises a SCGFailureInformation.

In one embodiment, the first message comprises a ULInformationTransfer.

In one embodiment, the first message is transmitted via a PC5 interface.

In one embodiment, the first message comprises a PC5-RRC message.

In one embodiment, the first message comprises a PC5-S message.

In one embodiment, the transmitter for the first signaling is a base station.

In one embodiment, the transmitter for the first signaling is a serving cell.

In one embodiment, the transmitter for the first signaling is a CellGroup.

In one embodiment, the CellGroup in the present disclosure is a Secondary Cell Group (SCG).

In one embodiment, the CellGroup in the present disclosure is a Master Cell Group (MCG).

In one embodiment, the first signaling comprises an RRC message.

In one embodiment, the first signaling comprises a Downlink Control Information (DCI) message.

In one embodiment, the first signaling comprises a PC5-RRC message.

In one embodiment, the first signaling comprises a PC5-S message.

In one embodiment, the first signaling comprises a MAC Control Element (CE).

In one embodiment, a physical channel occupied by the first signaling comprises a Physical Downlink Control Channel (PDCCH) or a physical downlink shared channel (PDSCH).

In one embodiment, the first signaling comprises a RRCReconfiguration.

In one embodiment, the first signaling comprises a RRCReconfigurationSidelink.

In one embodiment, the first signaling comprises a RRCConnectionReconfiguration.

In one embodiment, the first signaling comprises a RRCConnectionReconfigurationSidelink.

In one embodiment, K1 is a positive integer greater than 1, and the K1 is finite.

In one embodiment, K1 is no greater than 1024.

In one embodiment, K1 is no greater than 10240.

In one embodiment, K1 is no greater than 64.

In one embodiment, K1 is no greater than 32.

In one embodiment, K1 is no greater than 16.

In one embodiment, K1 is no greater than 4.

In one embodiment, K1 is equal to 2.

In one embodiment, K1 is equal to 4.

In one embodiment, the transmitter for the first signaling indicates a first time limit, a total length of time occupied by the K1 time windows being no greater than the first time limit.

In one subembodiment, a transmitter for the first signaling transmits the first time limit through a System Information Block (SIB).

In one subembodiment, a transmitter for the first signaling transmits the first time limit through a RRCReconfiguration or RRCConnectionReconfiguration.

In one subembodiment, the first time limit is X0 slot(s), where X0 is a positive integer.

In one subembodiment, the first time limit is X1 subframe(s), where X1 is a positive integer.

In one subembodiment, the first time limit is X2 frame(s), where X2 is a positive integer.

In one subembodiment, the first time limit is X3 subframe(s), where X3 is a positive integer.

In one subembodiment, the first time limit is Xm millisecond(s), where Xm is a positive integer.

In one subembodiment, Xm comprises at least one of {80, 120, 160, 240, 320, 640}.

In one subembodiment, the first time limit is configurable.

In one subembodiment, a value of the first time limit is related to a task executed by the first node in the K1 time windows.

In one subembodiment, the task executed in the K1 time windows comprises Tracking Area Update.

In one subembodiment, the task executed in the K1 time windows comprises Registration or Registration Update.

In one subembodiment, the task executed in the K1 time windows comprises a corresponding Paging.

In one subembodiment, the task executed in the K1 time windows comprises sending a busy indication.

In one subembodiment, the first node receives the first time limit before transmitting the first message.

In one embodiment, the above method is advantageous in that the time needed for completing each task varies slightly, so that determining the first time limit according to the specific task not only satisfies the requirement of the task for time but also reduces unnecessary communication interruption or waiting.

In one embodiment, the transmitter for the first signaling indicating a second time limit, a length of any time window among the K1 time windows being no greater than the second time limit.

In one subembodiment, a transmitter for the first signaling transmits the second time limit through a System Information Block (SIB).

In one subembodiment, a transmitter for the first signaling transmits the second time limit through a RRCReconfiguration or RRCConnectionReconfiguration.

In one subembodiment, the second time limit is Xx slot(s), where Xx is a positive integer.

In one subembodiment, the second time limit is X4 subframe(s), where X4 is a positive integer.

In one subembodiment, the second time limit is X5 frame(s), where X5 is a positive integer.

In one subembodiment, the second time limit is Xy millisecond(s).

In one subembodiment, Xy comprises at least one of {1, 2, 5, 10, 20, 40, 80}.

In one subembodiment, the second time limit is configurable.

In one subembodiment, a value of the second time limit is related to a task executed by the first node in the K1 time windows.

In one subembodiment, the task executed in the K1 time windows comprises random access.

In one subembodiment, the task executed in the K1 time windows comprises establishing an RRC connection.

In one subembodiment, the task executed in the K1 time windows comprises a Response Paging.

In one subembodiment, the task executed in the K1 time windows comprises sending a busy indication.

In one subembodiment, the first node receives the second time limit before transmitting the first message.

In one embodiment, a transmitter for the first signaling indicates a maximum value of K1.

In one subembodiment, a transmitter for the first signaling indicates the maximum value of the K1 by a SIB or a dedicated signaling.

In one subembodiment, the first signaling indicates stopping of a wireless transmission for the transmitter for the first signaling in the K2 time windows, where K2 is a positive integer less than K1.

In one subembodiment, upon reception of the K2, the first node sets the value of a variant K1 to K2.

In one subembodiment, upon reception of the K2, the first node drops time window(s) other than K2 time window(s) among the K1 time windows.

In one subembodiment, upon reception of the K2, the first node drops the (K2+1)-th time window to the K1-th time window; the action of dropping comprises performing wireless transmission for the transmitter for the first signaling within the (K2+1)-th time window through the K1-th time window.

In one embodiment, the transmitter for the first signaling indicates a second time threshold, a time interval between any two time windows among the K1 time windows is no greater than the second time threshold.

In one subembodiment, a transmitter for the first signaling indicates the second time threshold by a SIB or a dedicated signaling.

In one subembodiment, the first signaling indicates the second time threshold, upon reception of the time threshold the first node makes an adjustment such that a time interval between any two time windows among the K1 time windows is no greater than the second time threshold.

In one embodiment, the dedicated signaling includes a signaling transmitted on a DCCH.

In one embodiment, the dedicated signaling includes a RRCReconfiguration signaling.

In one embodiment, the dedicated signaling includes a RRCConnectionReconfiguration signaling.

In one embodiment, the dedicated signaling includes a RRCConnectionReconfigurationSidelink signaling.

In one embodiment, any two time windows among the K1 time windows are non-overlapping in time domain.

In one embodiment, the first signaling indicates acceptance/acknowledgment of a request of the first message.

In one embodiment, the first signaling indicates acceptance/acknowledgment of a request of the first message for stopping a wireless transmission for the transmitter for the first signaling in the K1 time windows.

In one embodiment, reception of the first signaling is deemed as the first message being accepted.

In one embodiment, the phrase of stopping a wireless transmission for the transmitter for the first signaling comprises: the transmitter for the first signaling won't perform uplink and/or downlink scheduling for the first node within the K1 time windows.

In one embodiment, the phrase of stopping a wireless transmission for the transmitter for the first signaling comprises: neither the transmitter for the first signaling nor an MCG and an SCG controlled by the transmitter for the first signaling will perform uplink and/or downlink scheduling for the first node within the K1 time windows.

In one embodiment, the phrase of stopping a wireless transmission for the transmitter for the first signaling comprises: the first node won't perform uplink and/or downlink scheduling for the transmitter for the first signaling within the K1 time windows.

In one embodiment, the first message indicates that the first node can only receive a second-type target signal transmitted by the transmitter for the first signaling within the K1 time windows.

In one embodiment, the second-type target signal comprises a radio signal bearing broadcast traffics.

In one embodiment, the second-type target signal comprises a radio signal bearing groupcast traffics.

In one embodiment, the second-type target signal comprises a radio signal bearing DCI.

In one embodiment, the second-type target signal comprises a radio signal bearing partial DCI format.

In one embodiment, the second-type target signal comprises a paging message.

In one embodiment, the second-type target signal comprises a RRCRelease.

In one embodiment, the second-type target signal comprises a RRCConnectionRelease.

In one embodiment, the second-type target signal comprises a SIB.

In one embodiment, the second-type target signal comprises an Earthquake and Tsunami Warning System (ETWS) signal.

In one embodiment, the second-type target signal comprises any radio signal transmitted by a transmitter for the first signaling.

In one embodiment, the second-type target signal comprises any radio signal associated with a specific CSI-RS which is transmitted by a transmitter for the first signaling.

In one embodiment, the first node determines the specific CSI-RS according to a candidate CSI-RS indicated by a transmitter for the first signaling.

In one embodiment, the second-type target signal comprises any radio signal associated with a specific SSB which is transmitted by a transmitter for the first signaling.

In one embodiment, the first node determines the specific SSB according to a candidate SSB indicated by a transmitter for the first signaling.

In one embodiment, the K1 time windows are of equal lengths.

In one embodiment, the K1 time windows are of unequal lengths.

In one embodiment, there are at least two time windows among the K1 time windows being of unequal lengths.

In one embodiment, the first node can perform a wireless transmission for the transmitter for the first signaling outside the K1 time windows.

In one embodiment, the first message is only for the K1 time windows, rather than indicating time-domain resources outside the K1 time windows.

In one embodiment, the first message is used for requesting for stopping a wireless reception for a transmitter for the first signaling within the K1 time windows.

In one embodiment, a length of the first time threshold is configurable.

In one embodiment, the first signaling is used for indicating the first time threshold.

In one embodiment, the first time threshold comprises $z1$ millisecond(s), where $z1$ is a positive integer.

In one embodiment, the first time threshold comprises $z2$ slot(s), where $z2$ is a positive integer.

In one embodiment, the first time threshold comprises $z3$ sub-frame(s), where $z3$ is a positive integer.

In one embodiment, the first time threshold comprises $z4$ frame(s), where $z4$ is a positive integer.

In one embodiment, the first time threshold comprises $z5$ second(s), where $z5$ is a positive integer.

In one embodiment, a time interval between any two adjacent time windows among the K1 time windows is the same.

In one embodiment, there are at least two groups of adjacent time windows among the K1 time windows between which time intervals are different.

In one embodiment, the transmitter for the first signaling and a transmitter for the second signaling are non-Co-located.

In one embodiment, the transmitter for the first signaling and a transmitter for the second signaling are maintained by 2 different base stations.

In one embodiment, the transmitter for the first signaling and a transmitter for the second signaling correspond to 2 different PLMNs.

In one embodiment, the second signaling is broadcast.

In one embodiment, the second signaling is groupcast.

In one embodiment, a receiver for receiving the second signaling is the same as a receiver for receiving the first signaling.

In one embodiment, a receiver for receiving the second signaling is different from a receiver for receiving the first signaling.

Embodiment 2

Figure 2:
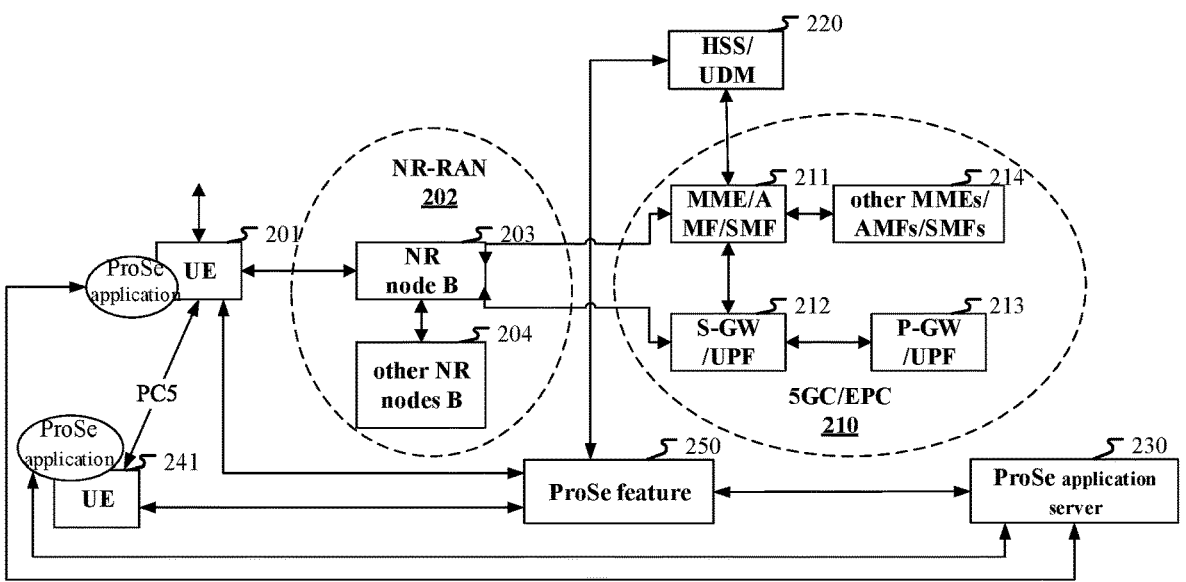
FIG. 2 illustrates a schematic diagram of a network architecture according to one embodiment of the present disclosure.

Embodiment 2 illustrates a schematic diagram of a network architecture according to the present disclosure, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called a 5G System/Evolved Packet System (5GS/EPS) 200 or other suitable terminology. The 5GS/EPS 200 may comprise one or more UEs 201, an NG-RAN 202, a 5G-Core Network/Evolved Packet Core (5GC/EPC) 210, a Home Subscriber Server/Unified Data Management (HSS/UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports transmissions in NTN.

In one embodiment, the UE 201 supports transmissions in large-delay-difference networks.

In one embodiment, the UE 201 supports V2X transmission.

In one embodiment, the UE 201 supports MBS transmission.

In one embodiment, the UE 201 supports MBMS transmission.

In one embodiment, the gNB 203 corresponds to the second node in the present disclosure.

In one embodiment, the gNB 203 supports transmissions in NTN.

In one embodiment, the gNB 203 supports transmissions in large-delay-difference networks.

In one embodiment, the gNB 203 supports V2X transmission.

In one embodiment, the gNB 203 supports MBS transmission.

In one embodiment, the gNB 203 supports MBMS transmission.

Embodiment 3

Figure 3:
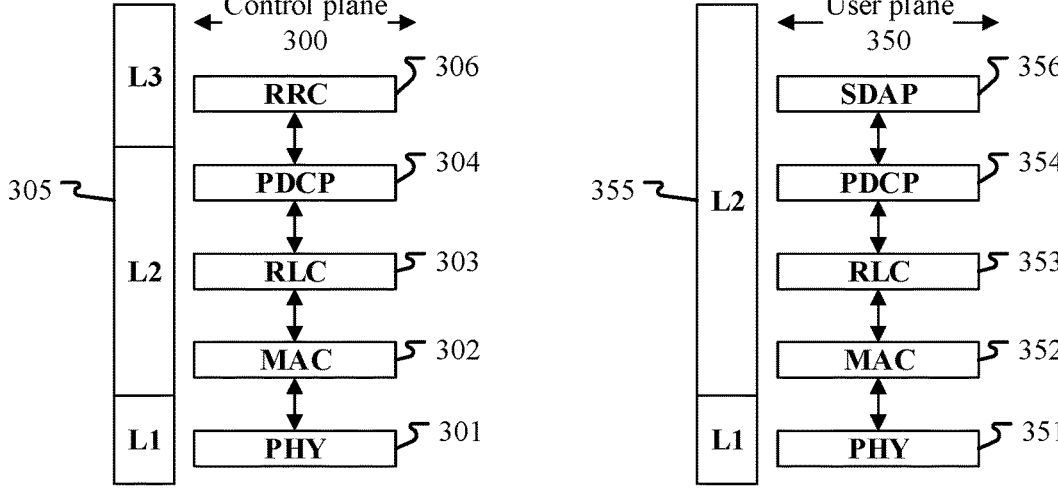
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, gNB or, satellite or aircraft in NTN) and a second node (gNB, UE, or satellite or aircraft in NTN), or between two UEs, is represented by three layers, i.e., layer 1, layer 2 and layer 3. The layer 1 (L1) is the lowest layer which performs signal processing functions of various PHY layers. The L is called PHY 301 in the present disclosure. The layer 2 (L2) 305 is above the PHY 301, and is in charge of the link between a first node and a second node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second nodes. The PDCP sublayer 304 provides multiplexing among variable radio bearers and logical channels. The PDCP sublayer 304 provides security by encrypting packets and also support for inter-cell handover of the first node between second nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several upper layers above the L2 355. Besides, it can also comprise a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first message in the present disclosure is generated by the PHY 301 or the PHY 351 or the MAC302 or the MAC352 or the RRC306 or a NAS.

In one embodiment, the first signaling in the present disclosure is generated by the PHY 301 or the PHY 351 or the MAC302 or the MAC352 or the RRC306 or a NAS.

In one embodiment, the second signaling in the present disclosure is generated by the PHY 301 or the PHY 351 or the MAC302 or the MAC352 or the RRC306 or a NAS.

In one embodiment, the third signaling in the present disclosure is generated by the PHY 301 or the PHY 351 or the MAC302 or the MAC352 or the RRC306 or a NAS.

In one embodiment, the first signal in the present disclosure is generated by the PHY 301 or the PHY 351 or the MAC302 or the MAC352 or the RRC306 or a NAS.

In one embodiment, the third signal in the present disclosure is generated by the PHY 301 or the PHY 351 or the MAC302 or the MAC352 or the RRC306 or a NAS.

In one embodiment, the fourth signal in the present disclosure is generated by the PHY 301 or the PHY 351 or the MAC302 or the MAC352 or the RRC306 or a NAS.

In one embodiment, the second message in the present disclosure is generated by the PHY 301 or the PHY 351 or the MAC302 or the MAC352 or the RRC306 or a NAS.

Embodiment 4

Figure 4:
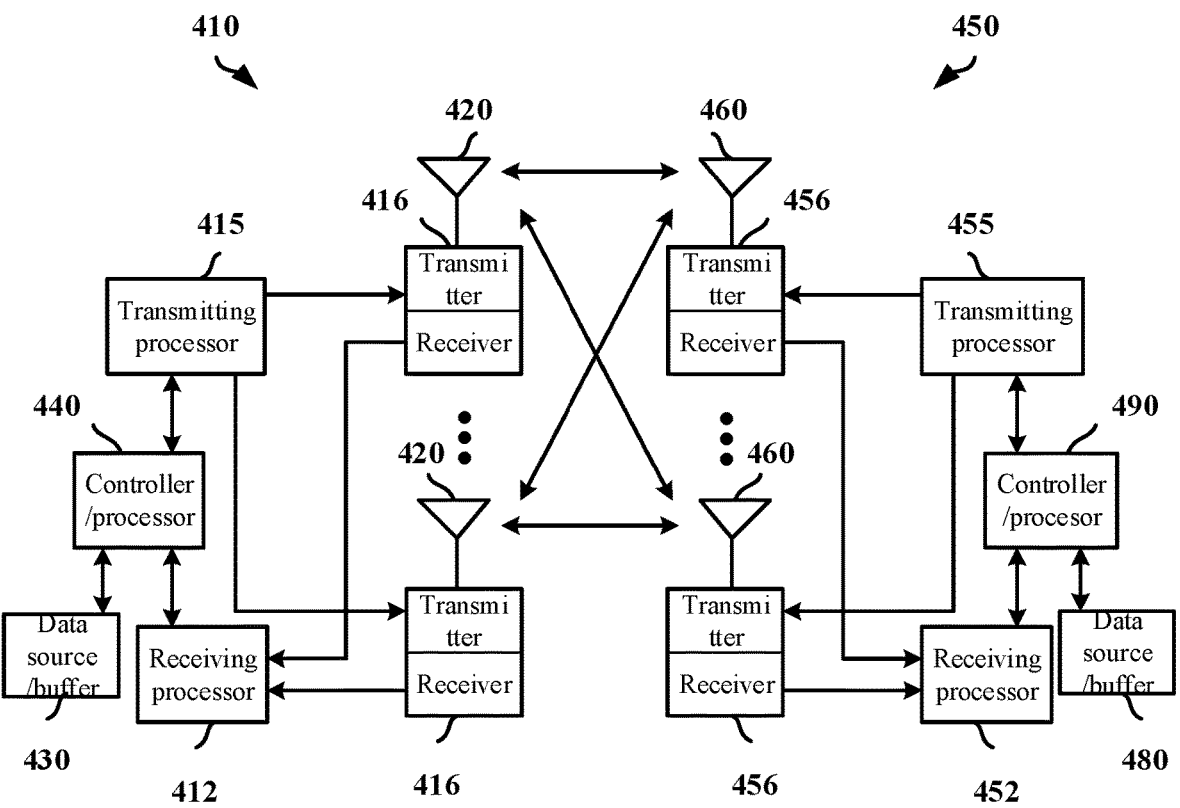
FIG. 4 illustrates a schematic diagram of a first communication device and a second communication device according to one embodiment of the present disclosure.

Embodiment 4 illustrates a schematic diagram of a first communication device and a second communication device according to the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also responsible for a retransmission of a lost packet, and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also in charge of a retransmission of a lost packet and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with a memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least transmits a first message; the first message being used for indicating K1 time windows; and receives a first signaling; where K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

In one embodiment, the first communication device 450 comprises a memory that stores a computer readable instruction program, the computer readable instruction program generates actions when executed by at least one processor, which include: transmitting a first message; the first message being used for indicating K1 time windows; and receiving a first signaling; where K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives a first message; the first message being used for indicating K1 time windows; and transmits a first signaling; herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for the second node in the K1 time windows; the first signaling is used for indicating acceptance of the request of the first message; a transmission time for the first message is a period of time other than the K1 time windows; a transmitter for the first message maintains an RRC connection with the second node within the K1 time windows, the first time threshold is of a length no shorter than a slot.

In one embodiment, the second communication device 410 comprises a memory that stores a computer readable instruction program, the computer readable instruction program generates actions when executed by at least one processor, which include: receiving a first message; the first message being used for indicating K1 time windows; and transmitting a first signaling; herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for the second node in the K1 time windows; the first signaling is used for indicating acceptance of the request of the first message; a transmission time for the first message is a period of time other than the K1 time windows; a transmitter for the first message maintains an RRC connection with the second node within the K1 time windows, the first time threshold is of a length no shorter than a slot.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a vehicle-mounted terminal.

In one embodiment, the first communication device 450 is a relay.

In one embodiment, the first communication device 450 is a satellite.

In one embodiment, the first communication device 450 is an aircraft.

In one embodiment, the second communication device 410 is a base station.

In one embodiment, the first communication device 410 is a relay.

In one embodiment, the second communication device 410 is a UE.

In one embodiment, the first communication device 410 is a satellite.

In one embodiment, the first communication device 410 is an aircraft.

In one embodiment, the receiver 456 (comprising the antenna 460), the receiving processor 452 and the controller/processor 490 are used for receiving the first signaling in the present disclosure.

In one embodiment, the receiver 456 (comprising the antenna 460), the receiving processor 452 and the controller/processor 490 are used for receiving the second signaling in the present disclosure.

In one embodiment, the receiver 456 (comprising the antenna 460), the receiving processor 452 and the controller/processor 490 are used for receiving the third signaling in the present disclosure.

In one embodiment, the transmitter 456 (comprising the antenna 460), the transmitting processor 455 and the controller/processor 490 are used for transmitting the first message in the present disclosure.

In one embodiment, the transmitter 456 (comprising the antenna 460), the transmitting processor 455 and the controller/processor 490 are used for transmitting the second message in the present disclosure.

In one embodiment, the transmitter 456 (comprising the antenna 460), the transmitting processor 455 and the controller/processor 490 are used for transmitting the first signal in the present disclosure.

In one embodiment, the transmitter 456 (comprising the antenna 460), the transmitting processor 455 and the controller/processor 490 are used for transmitting the third signal in the present disclosure.

In one embodiment, the transmitter 456 (comprising the antenna 460), the transmitting processor 455 and the controller/processor 490 are used for transmitting the fourth signal in the present disclosure.

In one embodiment, the transmitter 416 (comprising the antenna 420), the transmitting processor 412 and the controller/processor 440 are used for transmitting the first signaling in the present disclosure.

In one embodiment, the transmitter 416 (comprising the antenna 420), the transmitting processor 412 and the controller/processor 440 are used for transmitting the second signaling in the present disclosure.

In one embodiment, the transmitter 416 (comprising the antenna 420), the transmitting processor 412 and the controller/processor 440 are used for transmitting the third signaling in the present disclosure.

In one embodiment, the receiver 416 (comprising the antenna 420), the receiving processor 412 and the controller/processor 440 are used for receiving the first message in the present disclosure.

In one embodiment, the receiver 416 (comprising the antenna 420), the receiving processor 412 and the controller/processor 440 are used for receiving the second message in the present disclosure.

In one embodiment, the receiver 416 (comprising the antenna 420), the receiving processor 412 and the controller/processor 440 are used for receiving the first signal in the present disclosure.

In one embodiment, the receiver 416 (comprising the antenna 420), the receiving processor 412 and the controller/processor 440 are used for receiving the third signal in the present disclosure.

In one embodiment, the receiver 416 (comprising the antenna 420), the receiving processor 412 and the controller/processor 440 are used for receiving the fourth signal in the present disclosure.

Embodiment 5

Figure 5:
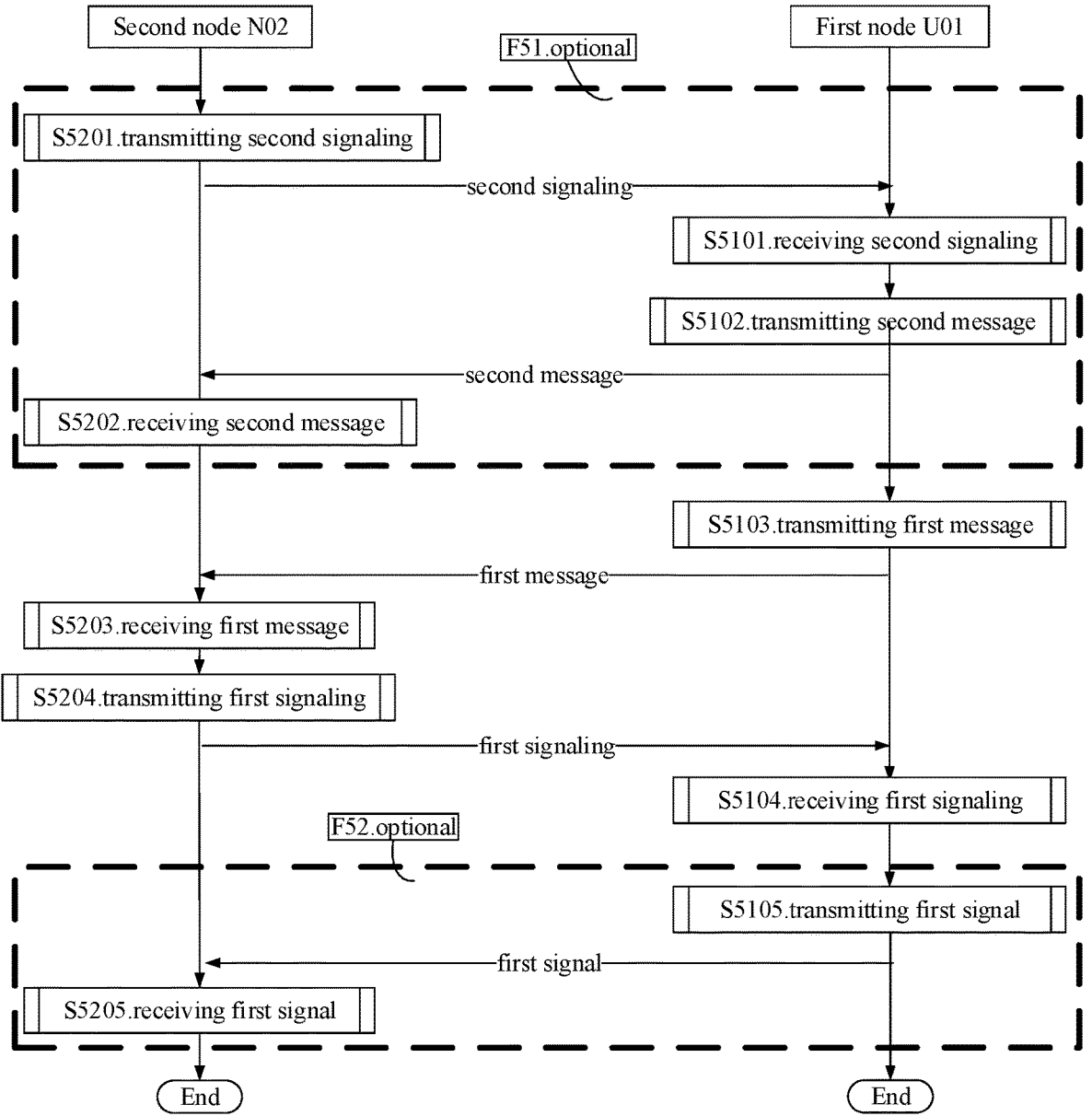
FIG. 5 illustrates a flowchart of radio signal transmission according to one embodiment of the present disclosure.

Embodiment 5 illustrates a flowchart of radio signal transmission according to one embodiment of the present disclosure, as shown in FIG. 5. In FIG. 5, the U01 corresponds to the first node in the present disclosure, while the N02 corresponds to the second node in the present disclosure. It should be particularly noted that the sequence illustrated herein does not set any limit to the signal transmission order or implementation order in the present disclosure, the steps marked by the F51 and F52 herein are optional.

The first node U01 receives a second signaling in step S5101; transmits a second message in step S5102; and transmits a first message in step S5103; receives a first signaling in step S5104; and transmits a first signal in step S5105.

The second node N02 transmits a second signaling in step S5201; receives a second message in step S5202; and receives a first message in step S5203; transmits a first signaling in step S5204; and receives a first signal in step S5205.

In Embodiment 5, the first message is used for indicating K1 time windows, where K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

In one embodiment, the first node U01 is a UE.

In one embodiment, the first node U01 is a relay.

In one embodiment, the second node N02 is a UE.

In one embodiment, the second node N02 is a base station.

In one embodiment, the second node N02 is satellite.

In one embodiment, the second node N02 is an NTN.

In one embodiment, the second node N02 is a TN.

In one embodiment, the second node N02 is a serving cell of the first node U01.

In one embodiment, the second node N02 is a cell group of the first node U01.

In one embodiment, the second node N02 is a PCell of the first node U01.

In one embodiment, the second node N02 is a SCell of the first node U01.

In one embodiment, the second node N02 is an MCG of the first node U01.

In one embodiment, the second node N02 is an SCG of the first node U01.

In one embodiment, the second node N02 is a SpCell of the first node U01.

In one embodiment, an interface of communications between the second node N02 and the first node U01 includes Uu.

In one embodiment, an interface of communications between the second node N02 and the first node U01 includes PC5.

In one embodiment, the second node N02 is a Source Cell or a Target Cell of the first node U01.

In one embodiment, a communication interface between the first node U01 and the second node N02 is a Uu interface.

In one embodiment, a communication interface between the first node U01 and the second node N02 is a PC5 interface.

In one embodiment, the first node U01 has two SIM cards, including a first SIM card and a second SIM card.

In one embodiment, the first SIM card is a SIM card for the second node N02; the second SIM card is a SIM card for a node and networks other than the second node N02.

In one embodiment, the first SIM card is a SIM card for the second node N02 or for networks of the second node N02; the second SIM card is a SIM card for a node other than the second node N02 or for networks other than the networks of the second node N02.

In one embodiment, the second node N02 is a transmitter for the first signaling.

In one embodiment, there is an RRC connection between the first node U01 and the second node N02.

In one embodiment, the first node U01 maintains an RRC connected state with the second node within the K1 time windows.

In one embodiment, the second node N02 transmit the first signaling through a PC5 interface.

In one embodiment, the second node N02 transmit the first signaling through a Uu interface.

In one embodiment, the second signaling comprises an RRC message.

In one embodiment, the second signaling comprises a Downlink Control Information (DCI) message.

In one embodiment, the second signaling comprises a PC5-RRC message.

In one embodiment, the second signaling comprises a PC5-S message.

In one embodiment, the second signaling comprises a MAC Control Element (CE).

In one embodiment, a physical channel occupied by the second signaling comprises a Physical Downlink Control Channel (PDCCH) or a physical downlink shared channel (PDSCH).

In one embodiment, the second signaling comprises a RRCReconfiguration.

In one embodiment, the second signaling comprises a RRCReconfigurationSidelink.

In one embodiment, the second signaling comprises a RRCConnectionReconfiguration.

In one embodiment, the second signaling comprises a RRCConnectionReconfigurationSidelink.

In one embodiment, the second signaling comprises a RRCSetup.

In one embodiment, the second signaling comprises a RRCResume.

In one embodiment, the second signaling comprises a RRCConnectionSetup.

In one embodiment, the second signaling comprises a RRCConnectionResume.

In one embodiment, the second signaling comprises a SIB.

In one embodiment, the second signaling is transmitted by means of broadcast.

In one embodiment, the second signaling is transmitted by means of unicast.

In one embodiment, a logical channel occupied by the second signaling comprises a Common Control Channel (CCCH).

In one embodiment, a logical channel occupied by the second signaling comprises a DCCH.

In one embodiment, the second signaling occupies a Signaling radio Bearer (SRB), the SRB comprising at least one of {SRB0, SRB1, SRB2, SRB3}.

In one embodiment, the second message is used to indicate that the first node U01 can receive signals transmitted by the second node N02 within the K1 time windows; a transmission time for the second message is a period of time other than the K1 time windows.

In one embodiment, a transmission time for the second message is before the K1 time windows.

In one embodiment, the first message comprises the second message.

In one embodiment, the second message comprises an RRC message.

In one embodiment, the second message comprises at least partial fields in a RRCSetupComplete.

In one embodiment, the second message comprises at least partial fields in a RRCResumeComplete.

In one embodiment, the second message comprises at least partial fields in a RRCConnectionSetupComplete.

In one embodiment, the second message comprises at least partial fields in a RRCConnectionResumeComplete.

In one embodiment, the second message comprises at least partial fields in a RRCReconfigurationComplete.

In one embodiment, the second message comprises at least partial fields in a RRCReconfigurationComplete Sidelink.

In one embodiment, the second message comprises at least partial fields in a RRCConnectionReconfiguration-Complete.

In one embodiment, the second message comprises at least partial fields in a RRCConnectionReconfiguration-Complete Sidelink.

In one embodiment, the second message comprises at least partial fields in UEAssistanceInformation.

In one embodiment, the second message comprises at least partial fields in a RRCReestablishmentComplete.

In one embodiment, the second message comprises at least partial fields in MCGFailureInformation.

In one embodiment, the second message comprises at least partial fields in SCGFailureInformation.

In one embodiment, the second message comprises at least partial fields in a ULInformationTransfer.

In one embodiment, the second message indicates capabilities of the first node U01.

In one embodiment, the second message comprises at least partial fields in UECapabilityInformation.

In one embodiment, the second message indicates whether the first node U01 can receive the second node with a capability reported within the K1 time windows.

In one subembodiment, the capability that is reported comprises contents contained in UE-NR-Capability.

In one subembodiment, the capability that is reported refers to that the second node N02 can deem that the first node has the capability of continuing to receive radio signals transmitted by the second node N02 within the K1 time windows.

In one subembodiment, the capability that is reported refers to that the second node N02 does not need to change its scheduling strategy.

In one subembodiment, the capability that is reported refers to that the second node N02 does not need to allocate additional time-frequency resources to the first node U01.

In one embodiment, the second message indicates whether the first node U01 can receive a radio signal transmitted by the second node with a capability previously reported within the K1 time windows.

In one subembodiment, the capability that is reported comprises a capability indicated by UECapabilityInformation.

In one embodiment, the second message indicates whether the first node U01 can receive a second-type target signal transmitted by the second node within the K1 time windows.

In one embodiment, the second message indicates that the first node U01 has the same capabilities within the K1 time windows as outside the K1 time windows.

In one embodiment, the second message indicates that the second node N02 can deem that the first node U01 has the same capabilities within the K1 time windows as outside the K1 time windows.

In one embodiment, the second message indicates a first capability set, the first capability set comprises wireless capabilities of the first node U01, and the first capability set refers to capabilities of the first node U01 within the K1 time windows.

In one subembodiment, the first node U01 has different capabilities within the K1 time windows from outside the K1 time windows.

In one subembodiment, the first capability set at least comprises one wireless capability.

In one subembodiment, the first capability set at least comprises one wireless capability that has changed compared with one previously reported.

In one subembodiment, the first capability set at least comprises one wireless capability that has changed compared with one comprised in UECapabilityInformation.

In one embodiment, the second message indicates that the first node U01 is equivalent to a Reduced Capability (Red-Cap) UE within the K1 time windows.

In one embodiment, the second message indicates that the first node U01 is equivalent to some kind of Reduced Capability (RedCap) UE within the K1 time windows.

In one embodiment, the second-type target signal comprises a radio signal bearing broadcast traffics.

In one embodiment, the second-type target signal comprises a radio signal bearing groupcast traffics.

In one embodiment, the second-type target signal comprises a radio signal bearing DCI.

In one embodiment, the second-type target signal comprises a radio signal bearing partial DCI format.

In one embodiment, the second-type target signal comprises a paging message.

In one embodiment, the second-type target signal comprises a RRCRelease.

In one embodiment, the second-type target signal comprises a RRCConnectionRelease.

In one embodiment, the second-type target signal comprises a SIB.

In one embodiment, the second-type target signal comprises an Earthquake and Tsunami Warning System (ETWS) signal.

In one embodiment, the second-type target signal comprises any radio signal transmitted by the second node N02.

In one embodiment, the second-type target signal comprises any radio signal associated with a specific CSI-RS which is transmitted by a second node N02.

In one embodiment, the first node U01 determines the specific CSI-RS according to a candidate CSI-RS indicated by the second node N02.

In one embodiment, the second-type target signal comprises any radio signal associated with a specific SSB which is transmitted by the second node N02.

In one embodiment, the first node U01 determines the specific SSB according to a candidate SSB indicated by the second node N02.

In one embodiment, the first signaling comprises the second signaling.

In one embodiment, the first signaling does not comprise the second signaling.

In one embodiment, the second signaling is used for indicating the first time threshold.

In one embodiment, the second signaling indicates a second time threshold; a time interval between any two time windows among the K1 time windows is no greater than the second time threshold.

In one embodiment, the second signaling indicates a first time limit.

In one embodiment, the second signaling indicates a second time limit.

In one embodiment, the second signaling indicates Kx, where Kx is a positive integer.

In one embodiment, the second signaling indicates Kx, where Kx is a positive integer greater than 1; K1 is no greater than Kx.

In one embodiment, the second signaling indicates that K1 is no greater than Kx, where Kx is a positive integer greater than 1.

In one subembodiment, the Kx is finite.

In one embodiment, the first message is used for triggering the first signaling.

In one embodiment, the second signaling is used to configure the first message.

In one embodiment, the second signaling is used to configure the second message.

In one embodiment, the first message indicates a start of a first time window among the K1 time windows.

In one subembodiment, the first time window among the K1 time windows is an earliest time window of the K1 time windows in time domain.

In one subembodiment, a start of the first time window among the K1 time windows is also a start of the K1 time windows.

In one subembodiment, the first message implicitly indicates a start of a first time window among the K1 time windows; the start of the first time window among the K1 time windows is a reception time for the first message.

In one subembodiment, the first message implicitly indicates a start of a first time window among the K1 time windows; the start of the first time window among the K1 time windows is a transmission time for the first message.

In one subembodiment, the start of the first time window among the K1 time windows is a determined time value.

In one subembodiment, the start of the first time window among the K1 time windows is equal to a sum of a reception time for the first message and a time offset.

In one subembodiment, the start of the first time window among the K1 time windows is a start time for a nearest DRX cycle.

In one subembodiment, the start of the first time window among the K1 time windows is equal to a sum of a transmission time for the first message and a time offset.

In one embodiment, the first message explicitly indicates a start of a first time window among the K1 time windows.

In one embodiment, the first signaling indicates a start of a first time window among the K1 time windows.

In one subembodiment, the first signaling indicates a start of the K1 time windows.

In one subembodiment, a start of the K1 time windows is a reception time for the first signaling.

In one subembodiment, a start of the K1 time windows is equal to a sum of a reception time for the first signaling and a time offset.

In one subembodiment, a start of the first time window among the K1 time windows indicated by the first signaling is a start time for determining a determined frame.

In one subembodiment, a start of the first time window among the K1 time windows indicated by the first signaling is a start time for determining a determined subframe.

In one embodiment, the first signal is used to request for performing the wireless transmission for the transmitter for the first signaling in a target time-domain resource; herein, the target time-domain resource belongs to the K1 time windows.

In one embodiment, the target time-domain resource belongs to a time window of the K1 time windows.

In one embodiment, the said time window is associated with time-domain resources occupied by the first signal.

In one embodiment, the said time window is explicitly indicated by the first signal.

In one embodiment, the target time-domain resource comprises all time windows after a first instance of time among the K1 time windows.

In one embodiment, the first instance of time is associated with time-domain resources occupied by the first signal.

In one embodiment, the first instance of time is explicitly indicated by the first signal.

In one embodiment, the first instance of time is implicitly indicated by the first signal; the first instance of time is a transmission time for the first signal.

In one embodiment, the first instance of time is implicitly indicated by the first signal; the first instance of time is a reception time for the first signal.

In one embodiment, the first instance of time is indicated by the second node N02.

In one embodiment, the first signaling is comprised of indexes time windows among the K1 time windows.

In one embodiment, the first node U01 receives a third signaling, the third signaling being used to indicate acceptance of a request of the first signal.

In one embodiment, the first signaling indicates a second instance of time, a transmission time for the first signal is no earlier than the second instance of time.

In one embodiment, the second signaling indicates a second instance of time, a transmission time for the second signal is no earlier than the second instance of time.

In one embodiment, the first message indicates a second instance of time, a transmission time for the first message is no earlier than the second instance of time.

In one embodiment, the first signal comprises one Transport Block (TB), the third signaling is a HARQ-ACK for the TB.

In one embodiment, the first signal comprises a Msg1, and the third signaling comprises a Msg2 for the first signal.

In one embodiment, the first signal comprises a random access signal, and the third signaling comprises a feedback for the first signal.

In one subembodiment, the third signaling comprises a Random Access Response (RAR).

In one subembodiment, the random access signal employs a non-contention-based method.

In one embodiment, the first signal comprises a random access signal, the random access signal employing a contention-based method.

In one embodiment, the first signal comprises a MsgA, and the third signaling comprises a MsgB for the first signal.

In one embodiment, the first signal comprises a scheduling request (SR), and the third signaling comprises a DCI for the first node U01.

In one embodiment, the first signal comprises a scheduling request (SR), and the third signaling comprises a MAC CE.

In one embodiment, the first signal comprises an RRC message.

In one embodiment, the first signal comprises a RRC-SetupRequest.

In one embodiment, the first signal comprises a RRCResumeRequest.

In one embodiment, the first signal comprises a RRCReestablishmentRequest.

In one embodiment, the third signaling comprises an RRC signaling.

In one embodiment, the third signaling comprises a RRCReconfiguration signaling.

Embodiment 6

Embodiment 6 illustrates a flowchart of radio signal transmission according to one embodiment of the present disclosure, as shown in FIG. 6. In FIG. 6, the U11 corresponds to the first node in the present disclosure, while the N12 corresponds to the second node in the present disclosure, the N13 is a node other than the second node. It should be particularly noted that the sequence illustrated herein does not set any limit to the signal transmission order or implementation order in the present disclosure, the steps marked by the F61 and F62 herein are optional. With the Embodiment 5 serving as the foundation, the content which is essential but not clearly described in the Embodiment 6 can refer to the Embodiment 5.

The first node U11 receives a second signaling in step S6101; transmits a second message in step S6102; and transmits a first message in step S6103; receives a first signaling in step S6104; transmits a third signal in step S6105; and transmits a first signal in step S6106.

The second node N12 receives a second message in step S6201; and receives a first message in step S6202; transmits a first signaling in step S6203; and receives a first signal in step S6204.

The third node N13 transmits a second signaling in step S6301; and receives a third signal in step S6302.

In Embodiment 6, the first message is used for indicating K1 time windows, where K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

In one embodiment, the first node U11 is a UE.

In one embodiment, the first node U11 is a relay.

In one embodiment, the second node N12 is a UE.

In one embodiment, the second node N12 is a base station.

In one embodiment, the second node N12 is a satellite.

In one embodiment, the second node N12 is an NTN.

In one embodiment, the second node N12 is a TN.

In one embodiment, the third node N13 is a UE.

In one embodiment, the third node N13 is a base station.

In one embodiment, the third node N13 is a satellite.

In one embodiment, the third node N13 is an NTN.

In one embodiment, the third node N13 is a TN.

In one embodiment, the third node N13 is an NTN, and the second node N12 is a TN.

In one embodiment, the second node N12 is a serving cell of the first node U11.

In one embodiment, the second node N12 is a cell group of the first node U11.

In one embodiment, the second node N12 is a PCell of the first node U11.

In one embodiment, the second node N12 is a SCell of the first node U11.

In one embodiment, the second node N12 is an MCG of the first node U11.

In one embodiment, the second node N12 is an SCG of the first node U11.

In one embodiment, the second node N12 is a SpCell of the first node U11.

In one embodiment, an interface of communications between the second node N12 and the first node U11 includes Uu.

In one embodiment, an interface of communications between the second node N12 and the first node U11 includes PC5.

In one embodiment, the second node N12 is a Source Cell or a Target Cell of the first node U11.

In one embodiment, the third node N13 is a serving cell of the first node U11.

In one embodiment, the third node N13 is a cell group of the first node U11.

In one embodiment, the third node N13 is a PCell of the first node U11.

In one embodiment, the third node N13 is a SCell of the first node U11.

In one embodiment, the third node N13 is an MCG of the first node U11.

In one embodiment, the third node N13 is an SCG of the first node U11.

In one embodiment, the third node N13 is a SpCell of the first node U11.

In one embodiment, an interface of communications between the third node N13 and the first node U11 includes Uu.

In one embodiment, an interface of communications between the third node N13 and the first node U11 includes PC5.

In one embodiment, the third node N13 is a Source Cell or a Target Cell of the first node U11.

In one embodiment, a communication interface between the first node U11 and the second node N12 is a Uu interface.

In one embodiment, a communication interface between the first node U11 and the second node N12 is a PC5 interface.

In one embodiment, a communication interface between the first node U11 and the third node N13 is a Uu interface.

In one embodiment, a communication interface between the first node U11 and the third node N13 is a PC5 interface.

In one embodiment, the first node U11 has two SIM cards, including a first SIM card and a second SIM card.

In one embodiment, the first SIM card is a SIM card for the second node N12; the second SIM card is a SIM card for the third node N13.

In one embodiment, the first SIM card is a SIM card of the second node N12; the second SIM card is a SIM card of the third node N13.

In one embodiment, the first SIM card is a SIM card of networks of the second node N12; the second SIM card is a SIM card of networks of the third node N13.

In one embodiment, the second node N12 is a transmitter for the first signaling.

In one embodiment, there is an RRC connection between the first node U11 and the second node N12.

In one embodiment, the first node U11 maintains an RRC connected state with the second node within the K1 time windows.

In one embodiment, the second node N12 transmit the first signaling through a PC5 interface.

In one embodiment, the second node N12 transmit the first signaling through a Uu interface.

In one embodiment, there is an RRC connection between the first node U11 and the third node N13.

In one embodiment, there isn't an RRC connection between the first node U11 and the third node N13.

In one embodiment, an RRC state between the first node U11 and the third node N13 is either an idle state or an inactive state.

In one embodiment, the second node N12 and the third node N13 belong to different networks.

In one embodiment, the second node N12 and the third node N13 belong to different network operators.

In one embodiment, the second node N12 and the third node N13 belong to different PLMNs.

In one embodiment, the second node N12 and the third node N13 are connected to different core networks.

In one embodiment, there isn't an interface between the second node N12 and the third node N13.

In one embodiment, the third node N13 is not any Scell for the second node N12.

In one embodiment, the second node N12 and the third node N13 do not belong to a same cell group.

In one embodiment, the third node N13 adopts the NR access technique.

In one embodiment, the third node N13 adopts the LTE access technique.

In one embodiment, a transmission delay from the third node N13 to the first node U11 is larger than that from the second node N12 to the first node U11.

In one embodiment, a transmission delay from the third node N13 to the first node U11 is much larger than that from the second node N12 to the first node U11.

In one embodiment, the second signaling comprises an RRC message.

In one embodiment, the second signaling comprises a Downlink Control Information (DCI) message.

In one embodiment, the second signaling comprises a PC5-RRC message.

In one embodiment, the second signaling comprises a PC5-S message.

In one embodiment, the second signaling comprises a MAC Control Element (CE).

In one embodiment, a physical channel occupied by the second signaling comprises a Physical Downlink Control Channel (PDCCH) or a physical downlink shared channel (PDSCH).

In one embodiment, the second signaling comprises a RRCReconfiguration.

In one embodiment, the second signaling comprises a RRCReconfigurationSidelink.

In one embodiment, the second signaling comprises a RRCConnectionReconfiguration.

In one embodiment, the second signaling comprises a RRCConnectionReconfigurationSidelink.

In one embodiment, the second signaling comprises a RRCSetup.

In one embodiment, the second signaling comprises a RRCResume.

In one embodiment, the second signaling comprises a RRCConnectionSetup.

In one embodiment, the second signaling comprises a RRCConnectionResume.

In one embodiment, the second signaling comprises a SIB.

In one embodiment, the second signaling is transmitted by means of broadcast.

In one embodiment, the second signaling is transmitted by means of unicast.

In one embodiment, a logical channel occupied by the second signaling comprises a Common Control Channel (CCCH).

In one embodiment, a logical channel occupied by the second signaling comprises a DCCH.

In one embodiment, the second signaling occupies a Signaling radio Bearer (SRB), the SRB comprising at least one of {SRB0, SRB1, SRB2, SRB3}.

In one embodiment, the second signaling is transmitted periodically.

In one embodiment, the second message is used to indicate that the first node U11 can receive signals transmitted by the second node N12 within the K1 time windows; a transmission time for the second message is a period of time other than the K1 time windows.

In one subembodiment, the signal transmitted by the second node N12 being received within the K1 time windows is the second-type target signal.

In one embodiment, the first node U11 transmits a third signal to the third node N13 within the K1 time windows, the third node N13 and the second node N12 belonging to different PLMNs.

In one embodiment, the first node U11 transmits the third signal within a time window of the K1 time windows.

In one embodiment, the first node U11 transmits the third signal within a first time window of the K1 time windows.

In one embodiment, the third signal comprises a random access signal.

In one embodiment, the third signal comprises a Msg1.

In one embodiment, the third signal comprises a MsgA.

In one embodiment, the third signal comprises a RRC-SetupRequest.

In one embodiment, the third signal comprises a RRCResumeRequest.

In one embodiment, the third signal comprises a RRCReestablishmentRequest.

In one embodiment, the third signal comprises a RRC-SystemInfoRequest.

In one embodiment, the third signal comprises a message in a Non-Access Stratum (NAS).

In one embodiment, the third signal comprises a RRC-ConnectionSetupRequest.

In one embodiment, the third signal comprises a RRC-ConnectionResumeRequest.

In one embodiment, the third signal comprises a RRC-ConnectionReestablishmentRequest.

In one embodiment, when transmitting the third signal, there isn't an RRC connection between the first node and the third node.

In one embodiment, the third signal indicates at least one first time window of the K1 time windows.

In one embodiment, the first node U11 receives a fourth signal from the third node within the K1 time windows.

In one embodiment, the fourth signal is used for feeding back the third signal.

In one embodiment, the third signal is used for triggering the fourth signal.

In one embodiment, the fourth signal comprises a DCI.

In one embodiment, a transmitter for the fourth signal is the third node N13.

In one embodiment, the third signal is a Msg1, while the fourth signal is a Msg2.

In one embodiment, the third signal is a MsgA, while the fourth signal is a MsgB.

In one embodiment, the third signal is a scheduling request (SR), while the fourth signal is a DCI.

In one embodiment, a time window indicated by the third signal is a second time window; the first node U11 transmits the third signal within the second time window.

In one embodiment, a time window indicated by the third signal is a time window following the second time window.

In one embodiment, the third signal indicates the K1 time windows.

In one embodiment, the third signal indicates at least one first time window after the second time window among the K1 time windows.

In one embodiment, the first node transmits a retransmission of the third signal within the K1 time windows.

In one embodiment, the first node receives a retransmission of the fourth signal within the K1 time windows.

In one embodiment, the first node transmits multiple copies of the third signal within the K1 time windows.

In one embodiment, the first node receives multiple copies of the fourth signal within the K1 time windows.

In one embodiment, the first node transmits a HARQ or ACK for the fourth signal within the K1 time windows.

In one embodiment, the first signaling indicates a second instance of time, a transmission time for the first signal is no earlier than the second instance of time.

In one embodiment, the second signaling indicates a second instance of time, a transmission time for the second signal is no earlier than the second instance of time.

In one embodiment, the first message indicates a second instance of time, a transmission time for the first message is no earlier than the second instance of time.

In one embodiment, the first signaling indicates a first reason, the first reason being the reason for the request for stopping a wireless transmission for the transmitter for the first signaling in the K1 time windows.

In one subembodiment, the first reason comprises tracking area update.

In one subembodiment, the first reason comprises positional zone update.

In one subembodiment, the first reason comprises registration update.

In one subembodiment, the first reason comprises RRC connection establishment.

In one subembodiment, the first reason comprises Small Data Transmission.

In one subembodiment, the first reason comprises Early Data Transmission (EDT).

In one subembodiment, the first reason comprises transmitting busy indication.

In one subembodiment, the first reason comprises RAN-based notification area (RNA) update.

In one subembodiment, the first reason comprises response paging.

In one subembodiment, the first reason comprises a request system message.

In one subembodiment, the first reason comprises receiving broadcast traffics.

In one subembodiment, the first reason comprises transmitting periodic measurements.

In one embodiment, the first signaling indicates a first reason set, the first reason belongs to the first reason set, the first reason set comprising at least one of {tracking area update, positional area update, registration update, RRC connection establishment, Small Data Transmission, Early Data Transmission (EDT), busy indication transmission, RAN-based notification area (RNA) update, response paging, request system message, broadcast traffics reception, transmission of periodic measurements}.

In one embodiment, the first signaling indicates a first candidate target time-domain resource set, the target time-domain resource belonging to the first candidate target time-domain resource set.

In one embodiment, the first signaling indicates a first candidate frequency resource set, the first signal occupying frequency resources in the first candidate frequency resource set.

In one subembodiment, the first candidate frequency resource set comprises at least one bandwidth part (BWP).

In one subembodiment, the first candidate frequency resource set comprises at least one Physical Resource Block (PRB).

In one embodiment, the first signaling indicates a random access sequence of the first signal; the random access sequence is based on a method of non-contention access.

In one embodiment, the first node U11 selects a time-domain resource belonging to the K1 time windows that is nearest to a current instance of time as the target time-domain resource.

In one embodiment, the first node U11 determines the target time-domain resource according to internal algorithm.

In one embodiment, the first node U11 determines frequency-domain resources of the target time-domain resource in the first candidate frequency resource set according to internal algorithm.

In one embodiment, the first node U11 randomly selects a candidate frequency in the first candidate frequency resource set as frequency-domain resources of the target time-domain resource.

In one embodiment, the first node U11 determines a length of the K1 time windows according to long-term statistics.

In one embodiment, the first node U11 determines a length of the K1 time windows at random according to a candidate value indicated by a serving cell.

In one embodiment, the first node U11 determines a start of a first time window among the K1 time windows according to traffic requirements.

In one embodiment, the fourth signal is used for triggering the first signal.

Embodiment 7

Embodiment 7 illustrates a schematic diagram of K1 time windows according to one embodiment of the present disclosure, as shown in FIG. 7.

In Embodiment 7, the first node has at least two SIM cards, which respectively correspond to a network of a transmitter for the first signaling and a network of a transmitter for the second signaling; the network of the transmitter for the first signaling is different from the transmitter for the second signaling; the network of the transmitter for the first signaling and the network of the transmitter for the second signaling are different.

In one embodiment, a network of a transmitter for the first signaling and a network of a transmitter for the second signaling belong to different Public Land Mobile Networks (PLMNs).

In one embodiment, a network of a transmitter for the second signaling is NTN.

In one embodiment, a transmitter for the second signaling is NTN.

In one embodiment, K1 is greater than 1, and the K1 is finite, less than positive infinity.

In one embodiment, a range of values of the K1 is indicated by a transmitter for the first signaling, and the range of values consists of finite positive integers.

In one embodiment, each of the K1 time windows is of an equal length.

In one embodiment, a length of each of the K1 time windows is w0, where w0 is a positive integer, w0 is measured by at least one of {millisecond, second, an OFDM symbol, a slot, a mini-slot, a sub-frame, a frame, a super-frame, minute, a DRX cycle, a paging cycle, a modification cycle, a system message cycle}.

In one embodiment, there are at least two time windows among the K1 time windows being of unequal lengths.

In one embodiment, a length of an i-th time window of the K1 time windows is $w(i)$, where i is a positive integer greater than or equal to 1 and less than or equal to K1, $w(i)$ is measured by at least one of {millisecond, second, an OFDM symbol, a slot, a mini-slot, a sub-frame, a frame, a super-frame, minute, a DRX cycle, a paging cycle, a modification cycle, a system message cycle}.

In one embodiment, a transmitter for the first signaling indicates a maximum value that is possible for K1.

In one embodiment, a transmitter for the first signaling indicates a maximum value that is possible for a longest time window of the K1 time windows.

In one embodiment, a transmitter for the first signaling indicates a minimum value that is possible for a shortest time window of the K1 time windows.

In one embodiment, the first message indicates a start of a first time window among the K1 time windows, the first time window being an earliest time window in time domain.

In one embodiment, the K1 time windows are discrete in time domain.

In one embodiment, the K1 time windows are discontinuous in time domain.

In one embodiment, $G(i, j+1)$ is a time interval between an i-th time window and a (i+1)-th time window among the K1 time windows, where i is a positive integer which is greater than or equal to 1 and less than K1, for instance, a time interval between a first time window and a second time window in FIG. 7 is $G(1, 2)$; an i-th time window and a (i+1)-th time window are two adjacent time windows.

In one subembodiment, $G(i, i+1)=G0$, namely, any two adjacent time windows among the K1 time windows are equally spaced by a time interval, the time interval being the G0, where G0 is greater than or equal to a slot.

In one subembodiment, $G(i, i+1)$ is greater than or equal to a slot.

In one subembodiment, for any $1<=i<K1$, $G(i, i+1)>=D1$, a transmitter for the first signaling indicates the D1; where D1 is a positive number.

In one subembodiment, for any $1<=i<K1$, $G(i, i+1)<=D2$, a transmitter for the first signaling indicates the D2; where D2 is a positive number.

In one subembodiment, for any $1<=i<K1$, $G(i, i+1)/w(i)>D3$, the transmitter for the first signaling indicates the D3; herein, $w(i)$ is a length of an i-th time window; D3 is a real number.

In one subembodiment, for any $1<=i<K1$, $G(i, i+1)/w(i+1)>D4$, the transmitter for the first signaling indicates the D4; herein, $w(i+1)$ is a length of a (i+1)-th time window; D4 is a real number.

In one subembodiment, for any $1<=i<K1$, $G(i, i+1)/(w(i)+w(i+1))>D5$, the transmitter for the first signaling indicates the D5; herein, $w(i)$ and $w(i+1)$ are respectively a length of an i-th time window and a length of a (i+1)-th time window; D5 is a real number.

In one subembodiment, for any $1<=i<K1$, $G(i, i+1)$ is much larger than a length of any time window among the K1 time windows.

In one subembodiment, the G0 is much larger than a length of any time window among the K1 time windows.

In one embodiment, a transmitter for the first signaling indicates a minimum value that is possible for G0.

In one embodiment, a transmitter for the first signaling indicates a maximum value that is possible for G0.

In one subembodiment, the first message indicates the G0.

In one subembodiment, for any $1<=i<K1$, the first message indicates the $G(i, i+1)$.

In one subembodiment, the G0 is determined by a transmission delay from the first node to the third node; the third node belongs to a network other than the network of the transmitter for the first signaling.

In one subembodiment, the G0 is equal to a transmission delay from the first node to the third node.

In one subembodiment, the G0 is equal to a maximum transmission delay from the first node to the third node.

In one subembodiment, the G0 is equal to an average transmission delay from the first node to the third node.

In one subembodiment, the G0 is equal to a sum of a minimum transmission delay from the first node to the third node and a time offset.

In one subembodiment, for any $1<=i<K1$, the $G(i, i+1)$ is determined by a transmission delay from the first node to the third node; the third node belongs to a network other than the network of the transmitter for the first signaling.

In one subembodiment, for any $1<=i<K1$, the $G(i, i+1)$ is equal to a transmission delay from the first node to the third node.

In one subembodiment, for any $1<=i<K1$, the $G(i, i+1)$ is equal to a maximum transmission delay from the first node to the third node.

In one subembodiment, for any $1<=i<K1$, the $G(i, i+1)$ is equal to an average transmission delay from the first node to the third node.

In one subembodiment, for any $1<=i<K1$, the $G(i, i+1)$ is equal to a sum of a minimum transmission delay from the first node to the third node and a time offset.

In one embodiment, the first message indicates a start of a first time window among the K1 time windows; the first signaling indicates a range of values of the start of the first time window among the K1 time windows.

In one embodiment, a value of $G(i, i+1)$ is related to i.

In one embodiment, a value of $G(i, i+1)$ fulfills a linear correlation with the value of i.

In one embodiment, a value of $G(i, i+1)$ fulfills a non-linear correlation with the value of i.

In one embodiment, K1=2.

In one embodiment, the second signaling is used for indicating a first parameter group; the first parameter group comprises a first offset; the first offset is used to determine a transmission time for a random access signal for a transmitter for the second signaling; the first parameter group is used to determine the $G(i, i+1)$.

In one subembodiment, a transmitter for the second signaling is the third node.

In one subembodiment, a transmitter for the second signaling is a network other than the network of the transmitter for the first signaling.

In one subembodiment, a transmitter for the second signaling belongs to NTN.

In one subembodiment, the first parameter group comprises Ephemeris of the transmitter for the second signaling.

In one subembodiment, the first parameter group comprises Orbit of the transmitter for the second signaling.

In one subembodiment, the first parameter group comprises a minimum transmission delay from the transmitter for the second signaling to the ground.

In one subembodiment, the first parameter group comprises an average transmission delay from the transmitter for the second signaling to the ground.

In one subembodiment, the first parameter group comprises whether a cell of the transmitter for the second signaling is in motion or static relative to the ground.

In one subembodiment, the first parameter group comprises an orbit type of the transmitter for the second signaling, the orbit type including at least one of {Low Earth Orbit (LEO), Middle/Medium Earth Orbit (MEO), Geosynchronous Earth Orbit (GEO)}.

In one subembodiment, the $G(i, i+1)$ is determined to be equal to a minimum transmission delay from the transmitter for the second signaling to the ground.

In one subembodiment, the $G(i, i+1)$ is determined to be equal to a maximum transmission delay from the transmitter for the second signaling to the ground.

In one subembodiment, the first parameter group comprises K_offset.

In one subembodiment, the $G(i, i+1)$ is equal to the K_offset.

In one subembodiment, the first parameter group comprises K_mac.

In one subembodiment, the $G(i, i+1)$ is equal to the K_offset+K_mac.

In one subembodiment, the $G(i, i+1)$ is equal to the $a*K\_offset+b*K\_mac$, where a is a positive integer, and b is an integer.

In one subembodiment, the $G(i, i+1)$ is equal to the $a*K\_offset+Kk$, where a is a positive integer, and Kk is a real number no greater than $a*K\_offset$.

In one subembodiment, the second signaling indicates the Kk.

In one subembodiment, the Kk is equal to K_mac.

In one subembodiment, the $G(i, i+1)$ is equal to the $a*K\_offset+Kk$, where a is a positive integer, and Kk is a real number no greater than $a*K\_offset$; the value(s) of the a and/or the Kk is(are) related to a number of HARQ retransmissions.

In one subembodiment, the $G(i, i+1)$ is equal to the $a*K\_offset+Kk$, where a is a positive integer, and Kk is a real number no greater than $a*K\_offset$; the value(s) of the a and/or the Kk is(are) related to whether transmitting HARQ feedback is supported.

In one subembodiment, the $G(i, i+1)$ is equal to the $a*K\_offset+Kk$, where a is a positive integer, and Kk is a real number no greater than $a*K\_offset$; the value(s) of the a and/or the Kk is(are) related to a number of repetitions; the number of repetitions comprises a number of repetitions of an uplink signal and a number of repetitions of a downlink signal.

In one subembodiment, the $G(i, i+1)$ is equal to the $a*K\_offset+Z$, where a is a positive integer, and Z is a positive number.

In one subembodiment, the first parameter group is related to a processing delay of the first node.

In one subembodiment, the value of the $G(i, i+1)$ is determined by an orbit position of the transmitter for the second signaling at a start time of the $G(i, i+1)$.

In one subembodiment, the value of the G(i, i+1) is determined by a transmission delay from the transmitter for the second signaling to the ground/the first node at a start time of the G(i, i+1).

In one subembodiment, the first node determines the a, the b, the Kk and the Z according to internal algorithm.

In one embodiment, the first message requests for transmitting a first-type radio signal for a node other than a transmitter for the first signaling within the K1 time windows.

In one subembodiment, the first-type radio signal comprises any radio signal.

In one subembodiment, the first-type radio signal comprises a random signal.

In one subembodiment, the first-type radio signal comprises a signal used for bearing an RRC signaling.

In one subembodiment, the first-type radio signal comprises a signal using an SRB0.

In one subembodiment, the first-type radio signal comprises a radio signal associated with an SSB.

In one subembodiment, the first-type radio signal comprises a signal for response paging.

In one subembodiment, the first-type radio signal comprises a signal for registration update.

In one subembodiment, the first-type radio signal comprises a signal for tracking area update.

In one embodiment, for any $1<=i<K1$, the w(i) is equal to Z.

In one embodiment, for any $1<=i<K1$, the w(i) is equal to Kk.

In one embodiment, for any $1<=i<K1$, the w(i) is equal to K_mac.

In one embodiment, for any $1<=i<K1$, the length of the w(i) depends on a number of repetitions, the number of repetitions comprising a number of repetitions of an uplink signal and a number of repetitions of a downlink signal.

In one embodiment, for any $1<=i<K1$, the length of the w(i) depends upon whether a HARQ feedback is supported.

In one embodiment, for any $1<=i<K1$, the length of the w(i) is no greater than 10 ms.

In one embodiment, for any $1<=i<K1$, the length of the w(i) is related to at least one of HARQ parameters K0, K1 or K2.

In one embodiment, for any $1<=i<K1$, the length of the w(i) is related to an allowable maximum number of retransmissions.

In one embodiment, the K1 is related to a maximum number of retransmissions allowable for a network to which the transmitter for the second signaling belongs.

Embodiment 7a

Embodiment 7a illustrates a schematic diagram of transmitting and receiving within a time window j according to one embodiment of the present disclosure, as shown in FIG. 7a.

The time window j in FIG. 7a is a time window among the K1 time windows. The oblique solid line with an arrow pointing down represents that data is transmitted from the third node to the first node; each oblique dotted-line with an arrow represents that transmission is optional.

In one embodiment, the first node has at least two SIM cards, which respectively correspond to a network of a transmitter for the first signaling and a network of the third node; the network of the transmitter for the first signaling is different from the third node; the network of the transmitter for the first signaling and the network of the third node are different.

In one embodiment, a transmitter for a first DCI is the third node, the first DCI is a DCI message, and the first DCI is used for scheduling first data.

In one embodiment, the first data repetition is a repetition of the first data.

In one embodiment, the first data can have R repetition(s) at most, where R is a positive integer, the first data repetition is one of the R repetition(s).

In one embodiment, the first feedback is a HARQ feedback, the first feedback being used for feeding back the first data.

In one embodiment, the first feedback repetition is a repetition of the first feedback.

In one embodiment, the first feedback can have R1 repetition(s) at most, where R1 is a positive integer, the first feedback repetition is one of the R1 repetition(s).

In one embodiment, a network of a transmitter for the first signaling and a network of the third node belong to different Public Land Mobile Networks (PLMNs).

In one embodiment, the third node is a transmitter for the second signaling.

In one embodiment, the first node at least needs to transmit data to and receive data from the third node in at least two time windows among the K1 time windows.

In one embodiment, the first node at least needs to transmit data to and receive data from the third node in each of the K1 time windows.

In one embodiment, a length of any time window of the K1 time windows only fulfills requirements for delay in one transmission between the first node and the third node rather than include requirement for time for a task.

In one subembodiment, a delay in the one transmission between the first node and the third node comprises a round trip delay (RTT).

In one subembodiment, a delay in the one transmission between the first node and the third node comprises delays in multiple transmissions of a same packet.

In one subembodiment, a delay in the one transmission between the first node and the third node comprises a delay required for a repetition or HARQ of a same packet.

In one subembodiment, a delay in the one transmission between the first node and the third node comprises a delay awaiting scheduling, delays in multiple transmissions of a same packet, and also a delay for transmitting an ACK and a NACK, rather than a delay for waiting for a next retransmission after sending a NACK.

In one subembodiment, a delay in the one transmission between the first node and the third node comprises a delay awaiting scheduling.

In one subembodiment, a delay in the one transmission between the first node and the third node comprises a delay for transmitting an ACK and a NACK.

In one subembodiment, a delay in the one transmission between the first node and the third node does not comprise a delay for waiting for a next retransmission after sending a NACK.

In one subembodiment, the task comprises a conversation.

In one subembodiment, the task comprises at least two transceiving behaviors.

In one subembodiment, the task comprises at least one interaction.

In one subembodiment, the task comprises at least multiple interactions.

In one subembodiment, the task comprises at least one interaction of an RRC signaling or a NAS.

In one subembodiment, the task comprises a TAU.

In one subembodiment, the task comprises a feedback paging.

In one subembodiment, the task at least requires two or all of the K1 time windows.

Embodiment 8

Embodiment 8 illustrates a schematic diagram of a second signaling used to indicate a first time threshold according to one embodiment of the present disclosure, as shown in FIG. 8.

In one embodiment, the first time threshold is equal to a slot.

In one embodiment, the first time threshold is equal to T time units, where the time unit comprises one of {millisecond, second, an OFDM symbol, a slot, a mini-slot, a sub-frame, a frame, a superframe, minute, a DRX cycle, a paging cycle, a modification cycle, a system message cycle}.

In one embodiment, the first node has at least two SIM cards, which respectively correspond to a network of a transmitter for the first signaling and a network of a third node; the network of the transmitter for the first signaling is different from the third node; the network of the transmitter for the first signaling and the network of the third node are different; the network of the transmitter for the first signaling and the network of the third node belong to different PLMNs; a transmitter for the second signaling is the transmitter for the first signaling.

In one subembodiment, the first node determines a transmission delay from the first node to the third node, a number which is N1 times the length of the transmission delay from the first node to the third node is greater than the first time threshold; where N1 is a positive integer or a real number greater than 1.

In one subembodiment, the first node determines a minimum transmission delay from the first node to the third node, a number which is N2 times the length of the minimum transmission delay from the first node to the third node is greater than the first time threshold; where N2 is a positive integer or a real number greater than 1.

In one subembodiment, the first node determines a maximum transmission delay from the first node to the third node, a number which is N3 times the length of the maximum transmission delay from the first node to the third node is greater than the first time threshold.

In one subembodiment, the third node indicates that K_offset,a1*K_offset+b1 is larger than the first time threshold; herein, a1 is a positive integer, b1 is a real number greater than or equal to 1.

In one subembodiment, the first node determines the a1 and b1 according to internal algorithm.

In one subembodiment, the first node determines the a1 and b1 depending on whether HARQ is supported.

In one subembodiment, the first node determines the N1, the N2 and the N3 according to internal algorithm.

In one embodiment, the first node has at least two SIM cards, which respectively correspond to a network of a transmitter for the first signaling and a network of a transmitter for the second signaling; the network of the transmitter for the first signaling is different from the transmitter for the second signaling; the network of the transmitter for the first signaling and the network of the transmitter for the second signaling are different; the network of the transmitter for the first signaling and the network of the transmitter for the second signaling belong to different PLMNs.

In one subembodiment, the second signaling indicates that K_offset, a1*K_offset+b1 is larger than the first time threshold; herein, a1 is a positive integer, b1 is a real number greater than or equal to 0.

In one subembodiment, the first node determines the a1 and the b1 according to internal algorithm In one subembodiment, the first node determines the a1 and the b1 depending on whether HARQ is supported.

In one subembodiment, the first node determines the a1 and the b1 according to a number of repetitions.

In one subembodiment, a1=1; b1=0.

In one subembodiment, the second signaling indicates orbit information for the transmitter for the second signaling.

In one subembodiment, a distance from the transmitter for the second signaling to the geocentre or the earth's surface or the first node is larger than a specific value; a period time for electromagnetic waves to travel a distance as long as the specific value is no smaller than the first time threshold.

In one embodiment, the second signaling indicates a first time threshold set, the first time threshold belonging to the first time threshold set.

In one embodiment, the first time threshold is equal to a time interval between any two time windows among the K1 time windows which are adjacent in time domain.

In one subembodiment, the first message indicates the first time threshold.

Embodiment 9

Embodiment 9 illustrates a schematic diagram of a first transmitter suspending a first timer within K1 time windows according to one embodiment of the present disclosure, as shown in FIG. 9.

In one embodiment, the first transmitter suspending a first timer within K1 time windows means the first node suspending a first timer within K1 time windows.

In one embodiment, the first timer is configured by a transmitter for the first signaling.

In one embodiment, the first timer is configured by the first signaling.

In one embodiment, the first timer is configured by a transmitter for the first signaling through a broadcast message.

In one embodiment, the first timer is configured by a transmitter for the first signaling through a unicast message.

In one embodiment, the first timer is configured by a transmitter for the first signaling through a SIB.

In one embodiment, the first timer is configured by a transmitter for the first signaling through an RRC message.

In one embodiment, the first timer is configured by a transmitter for the first signaling through RRCReconfiguration.

In one embodiment, the phrase of the first transmitter suspending a first timer within K1 time windows comprises: the first transmitter maintains a value of the first timer within K1 time windows.

In one embodiment, the phrase of the first transmitter suspending a first timer within K1 time windows comprises: the first transmitter sets the first timer to be suspended or an inactive state within K1 time windows.

In one embodiment, the phrase of the first transmitter suspending a first timer within K1 time windows comprises: the first transmitter suspends the first timer at a start of any time window among K1 time windows.

In one embodiment, the phrase of the first transmitter suspending a first timer within K1 time windows comprises: a third time window is any time window among the K1 time windows, if the first timer is in a running state before a start of the third time window, the first transmitter suspends the first timer at the start of the third time window.

In one embodiment, the phrase of the first transmitter suspending a first timer within K1 time windows comprises: a third time window is any time window among the K1 time windows, the first transmitter suspends the first timer at a start of the third time window.

In one embodiment, the phrase of the first transmitter suspending a first timer within K1 time windows comprises: a third time window is any time window among the K1 time windows, the first transmitter suspends the first timer at a start of the third time window, and the first transmitter proceeds with the first timer by an end of the third time window.

In one embodiment, the phrase of the first transmitter suspending a first timer within K1 time windows comprises: a third time window is any time window among the K1 time windows, the first transmitter suspends the first timer at a start of the third time window, and the first transmitter proceeds with the first timer after an end of the third time window.

In one embodiment, the phrase of the first transmitter suspending a first timer within K1 time windows comprises: a third time window is any time window among the K1 time windows, the first transmitter suspends the first timer since a start of the third time window, and the first transmitter proceeds with the first timer after an end of the third time window.

In one embodiment, the phrase of the first transmitter suspending a first timer within K1 time windows comprises: a third time window is any time window among the K1 time windows, the first transmitter suspends the first timer since a start of the third time window, and the first transmitter proceeds with the first timer upon an end of the third time window.

In one embodiment, the first timer comprises a T304.

In one embodiment, the first timer comprises a T310.

In one embodiment, the first timer comprises a T312.

In one embodiment, the first timer comprises a T316.

In one embodiment, the first timer comprises a T321.

In one embodiment, the first timer comprises a T322.

In one embodiment, the first timer comprises a T380.

In one embodiment, the first timer comprises a T400.

In one embodiment, the first node stops N310 counting within the K1 time windows.

In one embodiment, the first node stops N310 counting but does not stop N311 counting within the K1 time windows.

In one embodiment, the first node maintains N310 counting within the K1 time windows.

In one embodiment, the first node does not stop N310 counting within the K1 time windows.

Embodiment 10

Embodiment 10 illustrates a structure block diagram of a processing device used in a first node according to one embodiment of the present disclosure; as shown in FIG. 10. In FIG. 10, a processing device 1000 in the first node is comprised of a first receiver 1001, a first transmitter 1002 and a second receiver 1003.

In Embodiment 10, the first transmitter 1002 transmits a first message; the first message being used to indicate K1 time windows; and the first receiver 1001 receives a first signaling;

herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for a transmitter for the first signaling in the K1 time windows; the first signaling is used for indicating acceptance of the request of the first message; a transmission time for the first message is a period of time other than the K1 time windows; the first node maintains an RRC connection with the transmitter for the first signaling within the K1 time windows, the first time threshold is of a length no shorter than a slot.

In one embodiment, the second receiver 1003 receives a second signaling, the second signaling being used to indicate the first time threshold.

In one embodiment, the first message indicates a start of a first time window among the K1 time windows.

In one embodiment, the first transmitter 1002 transmits a first signal, the first signal being used to request for performing the wireless transmission for the transmitter for the first signaling in a target time-domain resource;

herein, the target time-domain resource belongs to the K1 time windows.

In one embodiment, the first transmitter 1002 transmits a third signal to a third node within the K1 time windows, the third node and the transmitter for the first signaling belonging to different PLMNs.

In one embodiment, the first transmitter 1002 transmits a second message; the second message is used to indicate that the first node can receive signals transmitted by the transmitter for the first signaling within the K1 time windows; a transmission time for the second message is a period of time other than the K1 time windows.

In one embodiment, the first transmitter 1002 suspends a first timer within the K1 time windows, the first timer being configured by the transmitter for the first signaling.

In one embodiment, the first node is a UE.

In one embodiment, the first node is a terminal supporting large time-delay difference.

In one embodiment, the first node is a terminal supporting NTN

In one embodiment, the first node is an aircraft.

In one embodiment, the first node is a vehicle-mounted terminal.

In one embodiment, the first node is a relay.

In one embodiment, the first node is a vessel.

In one embodiment, the first node is an IoT terminal.

In one embodiment, the first node is an IIoT terminal.

In one embodiment, the UE is a piece of equipment supporting transmissions with low delay and high reliability.

In one embodiment, the first node is a multicast-supporting node.

In one embodiment, the first receiver 1001 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1002 comprises at least one of the antenna 452, the transmitter 454, the transmitting processor 468, the multi-antenna transmitting processor 457, the controller/processor 459, the memory 460 or the data source 467 in Embodiment 4.

In one embodiment, the second receiver 1003 comprises at least one of the antenna 452, the receiver 454, the receiving processor 456, the multi-antenna receiving processor 458, the controller/processor 459, the memory 460 or the data source 467 in Embodiment 4.

Embodiment 11

Figure 11:
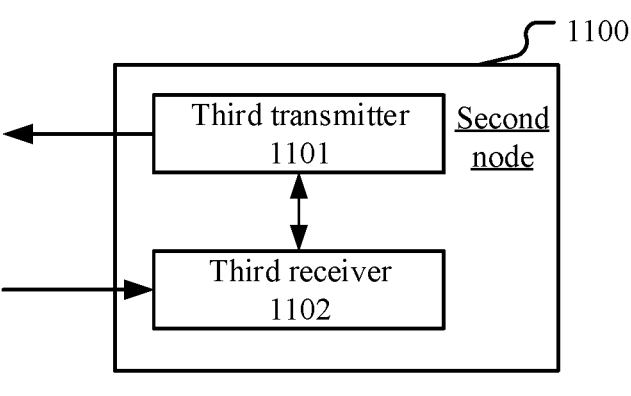
FIG. 11 illustrates a structure block diagram of a processing device in a second node according to one embodiment of the present disclosure.

Embodiment 11 illustrates a structure block diagram of a processing device used in a second node according to one embodiment of the present disclosure; as shown in FIG. 11. In FIG. 11, a processing device 1100 in the second node is comprised of a third transmitter 1101 and a third receiver 1102.

In Embodiment 11, the third receiver 1102 receives a first message; the first message being used to indicate K1 time windows; and the third transmitter 1101 transmits a first signaling;

herein, K1 is a positive integer greater than 1; any two time windows among the K1 time windows are orthogonal, the K1 time windows are arranged in a chronological order, and a time interval between any two of the K1 time windows in time domain is no smaller than a first time threshold; the first message is used to request for stopping wireless transmission for the second node in the K1 time windows; the first signaling is used for indicating acceptance of the request of the first message; a transmission time for the first message is a period of time other than the K1 time windows; a transmitter for the first message maintains an RRC connection with the second node within the K1 time windows, the first time threshold is of a length no shorter than a slot.

In one embodiment, a transmitter for the first message receives a second signaling, the second signaling being used to indicate the first time threshold.

In one embodiment, the first message indicates a start of a first time window among the K1 time windows.

In one embodiment, the first third receiver 1102 receives a first signal, the first signal being used to request for performing the wireless transmission for the second node in a target time-domain resource;

herein, the target time-domain resource belongs to the K1 time windows.

In one embodiment, the transmitter for the first message transmits a third signal to a third node within the K1 time windows, the third node and the second node belonging to different PLMNs.

In one embodiment, the third receiver 1102 receives a second message; the second message is used to indicate that the transmitter for the first message can receive signals transmitted by the second node within the K1 time windows; a transmission time for the second message is a period of time other than the K1 time windows.

In one embodiment, the transmitter for the first message suspends a first timer within the K1 time windows, the first timer being configured by the second node.

In one embodiment, the second node is satellite.

In one embodiment, the second node is a UE.

In one embodiment, the second node is an IoT node.

In one embodiment, the second node is a wearable node.

In one embodiment, the second node is a base station.

In one embodiment, the second node is a relay.

In one embodiment, the second node is an access point.

In one embodiment, the second node is a multicast-supporting node.

In one embodiment, the second node is satellite.

In one embodiment, the second transmitter 1101 comprises at least one of the antenna 420, the transmitter 418, the transmitting processor 416, the multi-antenna transmitting processor 471, the controller/processor 475 or the memory 476 in Embodiment 4.

In one embodiment, the second receiver 1102 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, satellite communication equipment, ship communication equipment, and NTN UE, etc. The base station or system device in the present disclosure includes but is not limited to macro-cellular base stations, micro-cellular base stations, home base stations, relay base station, gNB (NR node B), Transmitter Receiver Point (TRP), NTN base station, satellite equipment and fight platform, and other radio communication equipment, eNB (LTE node B), test equipment like transceiving device simulating partial functions of base station or signaling tester.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, the UE comprising:

a transceiver; and a processor, wherein the transceiver and the processor are configured to:

transmit a first message, wherein the first message indicates K1 time windows, and wherein K1 is a positive integer greater than 1, and wherein any two time windows among the K1 time windows are orthogonal, the K1 time windows are arranged in a chronological order, and a time interval between any two of the K1 time windows in time domain is no smaller than a first time threshold, and wherein the first message is used to request for stopping wireless transmission for a base station in the K1 time windows, and wherein a transmission time for the first message is a period of time other than the K1 time windows, and wherein the UE maintains a Radio Resource Control (RRC) connection with the base station within the K1 time windows, and wherein the first time threshold is of a length no shorter than a slot; and receive a first signaling, wherein the first signaling is indicative of acceptance of the request of the first message.

2. The UE according to claim 1, wherein the first time threshold comprises z1 millisecond(s), z1 being a positive integer.

3. The UE according to claim 2, wherein the transceiver and the processor are further configured to:

receive a second signaling, wherein the second signaling indicates the first time threshold.

4. The UE according to claim 1, wherein the first time threshold is equal to T time units, where the time unit comprises one of: {a Discontinuous Reception (DRX) cycle, a paging cycle, a modification cycle, or a system message cycle}.

5. The UE according to claim 1, wherein there are at least two time windows of unequal lengths among the K1 time windows.

6. The UE according to claim 5, wherein the first message indicates a start of a first time window among the K1 time windows, and wherein the number K1 is finite.

7. The UE according to claim 1, wherein the first message indicates a start of a first time window among the K1 time windows, and wherein the number K1 is finite.

8. The UE according to claim 1, wherein the first signaling comprises a Medium Access Control (MAC) Control Element (CE).

9. The UE according to claim 1, wherein the first message comprises at least partial fields in UEAssistanceInformation, while the first signaling comprises a RRCReconfiguration.

10. The UE according to claim 9, wherein the transceiver and the processor are further configured to:

transmit a first signal, the first signal being used to request for performing the wireless transmission for the base station in a target time-domain resource, wherein the target time-domain resource belongs to the K1 time windows, and wherein the first signal comprises an RRC message, and wherein the first signal comprises an RRC message, and wherein the target time-domain resource comprises all time windows behind a first instance of time among the K1 time windows.

11. The UE according to claim 1, wherein the transceiver and the processor are configured to:

transmit a first signal, the first signal being used to request for performing the wireless transmission for the base station in a target time-domain resource, wherein the target time-domain resource belongs to the K1 time windows.

12. The UE according to claim 11, wherein the target time-domain resource comprises all time windows behind a first instance of time among the K1 time windows.

13. The UE according to claim 12, wherein the first signal comprises an RRC message, the first instance of time being explicitly indicated by the first signal.

14. The UE according to claim 12, wherein the first signal comprises an RRC message, the first instance of time being implicitly indicated by the first signal.

15. The UE according to claim 1, wherein the transceiver and the processor are configured to:

transmit a second message, wherein the second message is used to indicate that the UE can receive signals transmitted by the base station within the K1 time windows, and wherein a transmission time for the second message is a period of time other than the K1 time window.

16. The UE according to claim 1, wherein the base station indicates a first time limit, and wherein a total length of time occupied by the K1 time windows is not greater than the first time limit.

17. The UE according to claim 1, wherein the base station indicates a second time limit, and wherein a length of any time window among the K1 time windows is not greater than the second time limit.

18. A base station for wireless communications, the base station comprising:

a transceiver; and a processor, wherein the transceiver and the processor are configured to:

receive a first message, wherein the first message indicates K1 time windows, and wherein K1 is a positive integer greater than 1, and wherein any two time windows among the K1 time windows are orthogonal, the K1 time windows are arranged in a chronological order, and a time interval between any two of the K1 time windows in time domain is no smaller than a first time threshold, and wherein the first message is used to request for stopping wireless transmission for the base station in the K1 time windows, and wherein a transmission time for the first message is a period of time other than the K1 time windows, and wherein a user equipment (UE) maintains a Radio Resource Control (RRC) connection with the base station within the K1 time windows, the first time threshold is of a length no shorter than a slot; and transmit a first signaling, wherein the first signaling is used for indicating acceptance of the request of the first message.

19. A method in a user equipment (UE) for wireless communications, the method comprising:

transmitting a first message, wherein the first message being used to indicate K1 time windows, and wherein K1 is a positive integer greater than 1—, and wherein any two time windows among the K1 time windows are orthogonal, the K1 time windows are arranged in a chronological order, and a time interval between any two of the K1 time windows in time domain is no smaller than a first time threshold, and wherein the first message is used to request for stopping wireless transmission for a base station in the K1 time windows, and wherein a transmission time for the first message is a period of time other than the K1 time windows, and wherein the first time threshold is of a length no shorter than a slot;

maintaining an RRC connection with the base station within the K1 time windows; and receiving a first signaling, wherein the first signaling is used for indicating acceptance of the request of the first message.

20. A method in a base station for wireless communications, the method comprising:

receiving a first message, wherein the first message indicates K1 time windows, and wherein K1 is a positive integer greater than 1, and wherein any two time windows among the K1 time windows are orthogonal, the K1 time windows are arranged in a chronological order, and a time interval between any two of the K1 time windows in time domain is no smaller than a first time threshold, and wherein the first message is used to request for stopping wireless transmission for the base station in the K1 time windows, and wherein a transmission time for the first message is a period of time other than the K1 time windows, and wherein a user equipment (UE) maintains a Radio Resource Control (RRC) connection with the base station within the K1 time windows, the first time threshold is of a length no shorter than a slot; and transmitting a first signaling, wherein the first signaling is used for indicating acceptance of the request of the first message.

\*　\*　\*　\*　\*